(12) United States Patent
Nishikibe et al.

(10) Patent No.: US 11,261,624 B2
(45) Date of Patent: Mar. 1, 2022

(54) OPENING/CLOSING BODY CONTROL DEVICE FOR VEHICLES

(71) Applicant: AISIN SEIKI KABUSHIKI KAISHA, Kariya (JP)

(72) Inventors: Takeshi Nishikibe, Tokai (JP); Noriyuki Kamiya, Chita-gun (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 324 days.

(21) Appl. No.: 16/500,290

(22) PCT Filed: Mar. 12, 2018

(86) PCT No.: PCT/JP2018/009472
§ 371 (c)(1),
(2) Date: Oct. 2, 2019

(87) PCT Pub. No.: WO2018/186111
PCT Pub. Date: Oct. 11, 2018

(65) Prior Publication Data
US 2021/0095500 A1    Apr. 1, 2021

(30) Foreign Application Priority Data
Apr. 7, 2017    (JP) .............................. JP2017-077094

(51) Int. Cl.
*E05B 81/74* (2014.01)
*E05B 81/56* (2014.01)
(Continued)

(52) U.S. Cl.
CPC .............. *E05B 81/74* (2013.01); *E05B 81/56* (2013.01); *E05B 83/40* (2013.01); *E05B 85/26* (2013.01); *B60J 5/06* (2013.01); *E05B 85/243* (2013.01)

(58) Field of Classification Search
CPC .......... E05B 81/56; E05B 81/60; E05B 81/64; E05B 81/66; E05B 81/68; E05B 81/74;
(Continued)

(56) References Cited

U.S. PATENT DOCUMENTS 7,579,938 B2 * 8/2009 Teshima ................. B60R 25/24
340/5.72
2009/0165386 A1    7/2009 Suzuki et al.
(Continued)

FOREIGN PATENT DOCUMENTS

EP    2119857 A1 * 11/2009 ............. E05B 81/14
JP    2002-250163 A    9/2002
(Continued)

OTHER PUBLICATIONS

International Search Report dated May 29, 2018 in PCT/JP2018/009472 filed Mar. 12, 2018.

*Primary Examiner* — Kristina R Fulton
*Assistant Examiner* — Noah Horowitz
(74) *Attorney, Agent, or Firm* — Oblon, McClelland, Maier & Neustadt, L.L.P.

(57) ABSTRACT

This opening/closing body control device for vehicles comprises a lock device and a control device. The control device comprises: a reversal control unit; a reversal stopping unit; a first error detection unit that detects a first state change error in a first neutral switch, when reverse rotation of a rotating member has been stopped on the basis of a change in the on/off state of a second neutral switch during reverse control after closing control; and a second error detection unit that detects a second state change error in the first neutral switch, when reverse rotation of the rotating member is stopped on the basis of a change in the on/off state of the second neutral switch during reverse control after release control.

5 Claims, 16 Drawing Sheets

(51) Int. Cl.
*E05B 83/40* (2014.01)
*E05B 85/26* (2014.01)
*B60J 5/06* (2006.01)
*E05B 85/24* (2014.01)

(58) Field of Classification Search
CPC .......... E05B 83/40; E05B 81/06; E05B 81/14;
E05B 81/18; E05B 81/20; E05B 81/30;
E05B 85/26; E05B 85/243; B60J 5/06;
Y10S 292/23; Y10T 292/1082; Y10T
292/1047
USPC ....................................................... 340/5.72
See application file for complete search history.

(56) References Cited

U.S. PATENT DOCUMENTS

| | | | |
|---|---|---|---|
| 2011/0016794 A1 | 1/2011 | Nishikibe et al. | |
| 2020/0056407 A1* | 2/2020 | Kamiya | E05B 85/243 |
| 2020/0377150 A1* | 12/2020 | Hidaka | B62D 5/0481 |
| 2021/0102413 A1* | 4/2021 | Nishikibe | E05B 81/66 |

FOREIGN PATENT DOCUMENTS

| | | |
|---|---|---|
| JP | 2009-155938 A | 7/2009 |
| JP | 2011-26832 A | 2/2011 |
| JP | 2016-98612 A | 5/2016 |

* cited by examiner

OPENING/CLOSING BODY CONTROL DEVICE FOR VEHICLES

TECHNICAL FIELD

The present invention relates to a vehicle opening/closing body controller.

BACKGROUND ART

Patent Document 1 discloses an example of a vehicle lock device including a latch mechanism and a pivot member. The latch mechanism performs a closing action and a releasing action in accordance with a pivot direction of the pivot member that is pivoted in a first direction and a second direction, which is opposite to the first direction. An opening/closing body controller that includes such a lock device executes closing control that performs a closing action with the latch mechanism to constrain a vehicle opening/closing body to the body of a vehicle and releasing control that performs a releasing action with the latch mechanism to release the constrained opening/closing body. In such an opening/closing body controller, after closing control or releasing control is completed, reversing control of the pivot member is an important issue.

Patent Documents 2 and 3 describe examples of configurations in which neutral return control and stress easing control are executed after closing control is completed. The neutral return control is executed under a normal situation to stop reverse pivoting of the pivot member based on an on/off state of a neutral switch. The stress easing control stops reverse pivoting of the pivot member using a time measuring counter (timer). Patent Document 4 describes an example of configuration that forms a neutral range between a closing range and a releasing range by combining a first neutral switch, which changes an on/off state when a pivot member is pivoted in a first direction, and a second neutral switch, which changes an on/off state when the pivot member is pivoted in a second direction. Patent Document 4 further describes a fail-safe configuration that is obtained by the two neutral switches complementing each other and allows for detection of an anomaly occurring in one of the neutral switches.

PRIOR ART DOCUMENT

Patent Documents

Patent Document 1: Japanese Laid-Open Patent Publication No. 2016-98612
Patent Document 2: Japanese Laid-Open Patent Publication No. 2002-250163
Patent Document 3: Japanese Laid-Open Patent Publication No. 2011-26832
Patent Document 4: Japanese Laid-Open Patent Publication No. 2009-155938

SUMMARY OF THE INVENTION

Problems that the Invention is to Solve

Vehicle components have always been subject to technical improvements. Thus, an opening/closing body controller including a lock device such as that described above is also subject to the creation of new technology satisfying higher quality.

It is an objective of the present invention to provide a vehicle opening/closing body controller executing reversing control on a pivot member that performs a closing action and a releasing action with a latch mechanism in accordance with pivot directions in a more appropriate manner.

Means for Solving the Problems

A vehicle opening/closing body controller including a lock device including a latch mechanism and a controller that is configured to control actuation of the lock device, in which the lock device is configured to perform a closing action and a releasing action with the latch mechanism in accordance with a pivot direction of a pivot member pivoted in a first direction and a second direction, which is opposite to the first direction, between a first pivot end and a second pivot end, the lock device includes a first neutral switch configured to change an on/off state at first and second state change points that are pivot positions of the pivot member between the first pivot end and the second pivot end, and a second neutral switch configured to change an on/off state at a third state change point that is a pivot position of the pivot member between the first and second state change points, the controller is configured to execute closing control that constrains a vehicle opening/closing body with the latch mechanism by pivoting the pivot member in the first direction and performing the closing action with the latch mechanism and execute releasing control that releases the constraint on the opening/closing body with the latch mechanism by pivoting the pivot member in the second direction and performing the releasing action with the latch mechanism, the controller includes, a reversing controller configured to execute reversing control for reversely pivoting the pivot member after the closing control is completed and after the releasing control is completed, a reversing stopper configured to stop the reverse pivoting of the pivot member based on a change in the on/off state of the first neutral switch or a change in the on/off state of the second neutral switch, a first anomaly detector configured to detect a first state change anomaly that occurs in the first neutral switch when the reverse pivoting of the pivot member is stopped based on a change in the on/off state of the second neutral switch during the reversing control after the closing control, and a second anomaly detector configured to detect a second state change anomaly that occurs in the first neutral switch when the reverse pivoting of the pivot member is stopped based on a change in the on/off state of the second neutral switch during the reversing control after the releasing control.

MODES FOR CARRYING OUT THE INVENTION

One embodiment of a vehicle opening/closing body controller for a power sliding door device will now be described with reference to the drawings.

Figure 1:
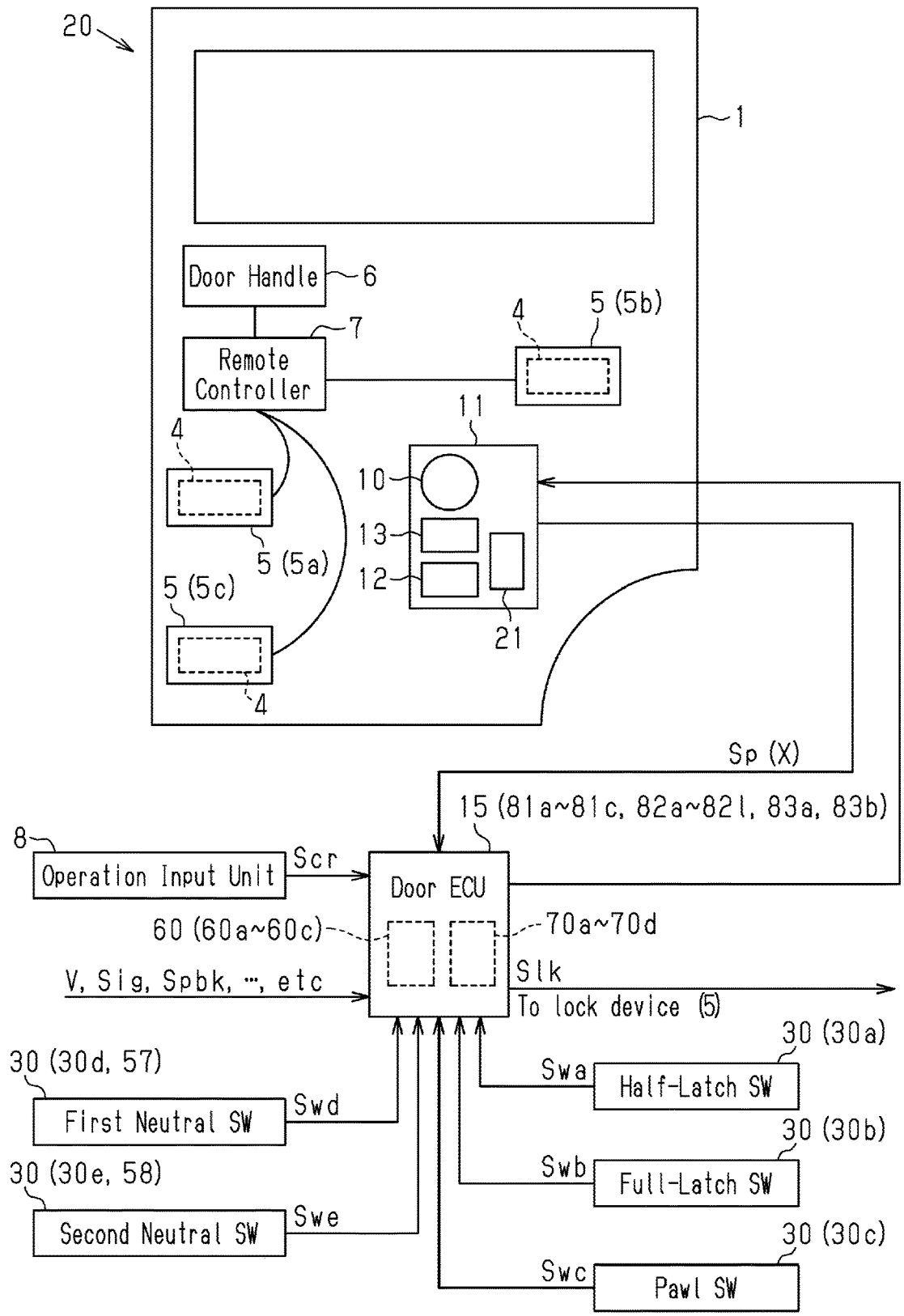
FIG. 1 is a schematic diagram of a power sliding door device.

As shown in FIG. 1, a sliding door 1, which serves as an opening/closing body, is supported by a side of a vehicle (not shown) and moved in the front-rear direction to open and close a door opening formed in the side of the vehicle. Specifically, the sliding door 1 moves toward the front of the vehicle (leftward in FIG. 1) to close the door opening in a fully closed state. The sliding door 1 is configured to move toward the rear of the vehicle (rightward in FIG. 1) and open the door opening to allow an occupant to get in and out of the vehicle through the door opening.

The sliding door 1 includes lock devices 5, each including a latch mechanism 4 for engagement with a striker (not shown) arranged in the body of the vehicle. Specifically, the sliding door 1 includes a front lock 5a and a rear lock 5b serving as a full-close lock that holds the sliding door 1 at a fully closed position. The sliding door 1 also includes a full-open lock 5c that holds the sliding door 1 at a fully open position. The sliding door 1 includes a door handle 6 (outside door handle and inside door handle) that releases constraint on the latch mechanisms 4 of the lock devices 5 to open and close the sliding door 1.

Specifically, an operation force applied to the door handle 6 of the sliding door 1 is mechanically transmitted to the lock devices 5 via, for example, a remote controller 7 (remote-control device), which is connected to the lock devices 5 by transmitting members such as a wire cable and a link. This disengages the latch mechanisms 4 from the corresponding strikers, that is, releases the constrained latch mechanisms 4 from the body of the vehicle in the fully closed state or the fully open state so that the sliding door 1 can be opened and closed with, for example, the door handle 6 that serves as a holding portion.

The sliding door 1 can also disengage the latch mechanisms 4 of the lock devices 5 when the user operates the door handle 6 or an operation input unit 8 arranged inside a passenger compartment or on a mobile device or the like. The sliding door 1 includes a door actuator 11 that opens and closes the sliding door 1 using a motor 10 as a drive source.

Specifically, the door actuator 11 includes an opening/closing drive unit 12 that opens and closes the sliding door 1 with a drive cable (not shown). The door actuator 11 also includes an electromagnetic clutch 13 arranged between the opening/closing drive unit 12 and the motor 10. A door ECU 15, which serves as a controller, controls actuation of the door actuator 11 of the sliding door 1. The sliding door 1 is configured as a power sliding door device 20 that is opened and closed by the driving force of the motor 10. The door ECU 15 may be configured as circuitry including 1) one or more dedicated hardware circuits such as ASIC, 2) one or more processors that operate according to a computer program (software), or 3) a combination thereof. The processor includes a CPU and memories such as a RAM and a ROM. The memories store program codes or commands configured to cause the CPU to execute processes. The memories, or computer readable media, include any type of media that are accessible by versatile computers and dedicated computers.

In detail, the door ECU 15 receives an operation input signal Scr indicating that the operation input unit 8 has been operated. The door ECU 15 controls actuation of the sliding door 1 based on an actuation request of the user, which is indicated by the operation input signal Scr.

Specifically, the door ECU 15 controls actuation of the door actuator 11 to move the sliding door 1 in an opening or closing direction as indicated by the actuation request (door driving control). When the door ECU 15 opens or closes the sliding door 1 in the fully open state or the fully closed state, prior to the door driving control, the door ECU 15 first controls actuation of the lock device 5 (releasing control) by outputting a lock control signal Slk to perform a release action with the latch mechanism 4 constraining the sliding door 1 to the body of the vehicle. When the sliding door 1 has moved to the fully closed position, the door ECU 15 controls the actuation of the lock device 5 to shift the latch mechanisms 4 from the half-latched state to the fully-latched state in response to the output of the lock control signal Slk (closing control).

The door ECU 15 controls actuation of the electromagnetic clutch 13 arranged in the door actuator 11 to open and close a torque transmission path between the motor 10 and the opening/closing drive unit 12. In other words, during the door driving control, rotation of the motor 10 is controlled in a state (ON actuation) in which the electromagnetic clutch 13 closes the drive force transmission path of the sliding door 1. A manual operation performed by the user actuates the electromagnetic clutch 13 (OFF actuation) and opens the drive force transmission path. This smoothly opens and closes the sliding door 1 of the power sliding door device 20.

More specifically, the door actuator 11 includes a pulse sensor 21 that outputs pulse signals Sp in synchronism with rotation of the motor 10, and the door ECU 15 detects an opening/closing action position X (and movement speed) of the sliding door 1 by counting the pulse signals Sp. A state quantity such as a vehicle speed V and control signals such as an ignition signal Sig and a parking brake signal Spbk, for example, are input to the door ECU 15. The door ECU 15 controls the actuation of the sliding door 1 based on various types of state quantity and control signals of the sliding door 1 and the vehicle.

The lock devices of the power sliding door device 20, more specifically, the rear lock 5*b* serving as the full-close lock includes sensor switches 30 (30*a* to 30*e*). The door ECU 15 detects the actuation state of the lock device 5 based on signals Swa to Swe output from the sensor switches 30.

Figure 2:
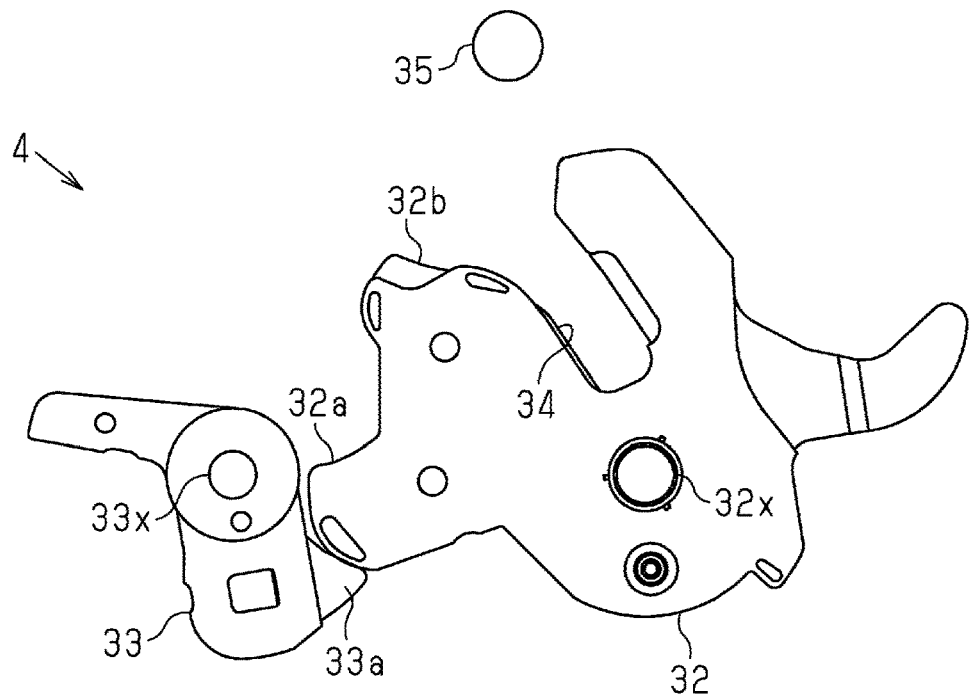
FIG. 2 is a diagram illustrating a latch mechanism in an unlatched state.

Specifically, as shown in FIG. 2, the latch mechanism 4 includes a latch 32 and a pawl 33, which are respectively supported pivotally about support shafts 32*x* and 33*x*. The latch 32 is substantially flat and includes a striker engagement groove 34 that opens in a peripheral surface of the latch 32. The latch 32 is urged clockwise as viewed in FIGS. 2 and 4 by a latch spring (not shown). The latch 32 abuts a stopper portion (not shown) so that pivoting of the latch 32 based on an urging force of the latch spring is restricted at a position where an open end of the striker engagement groove 34 faces the striker 35 arranged in the body of the vehicle. Consequently, when the sliding door 1 closes, the striker 35 of the body of the vehicle is engaged with the striker engagement groove 34 of the latch 32.

Figure 3:
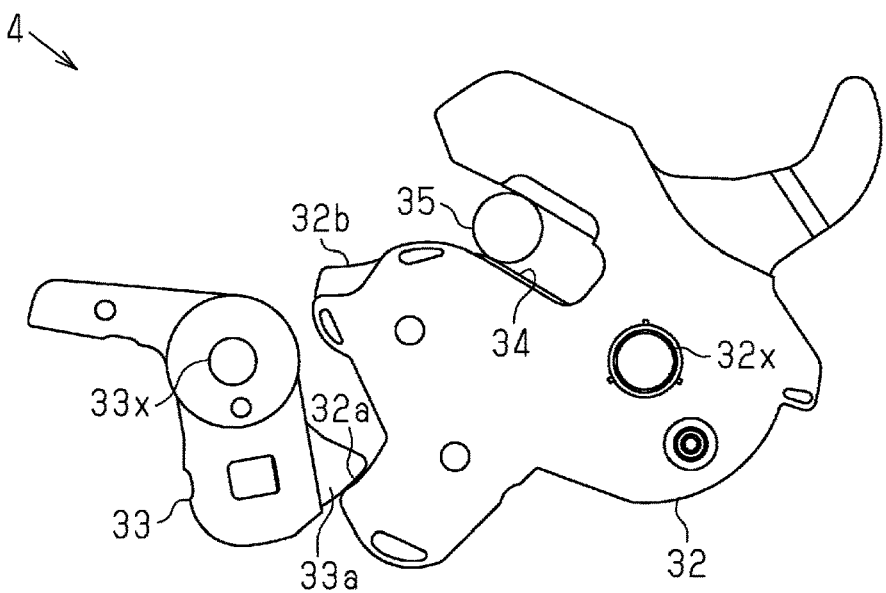
FIG. 3 is a diagram illustrating a latch mechanism in a half-latched state.
Figure 4:
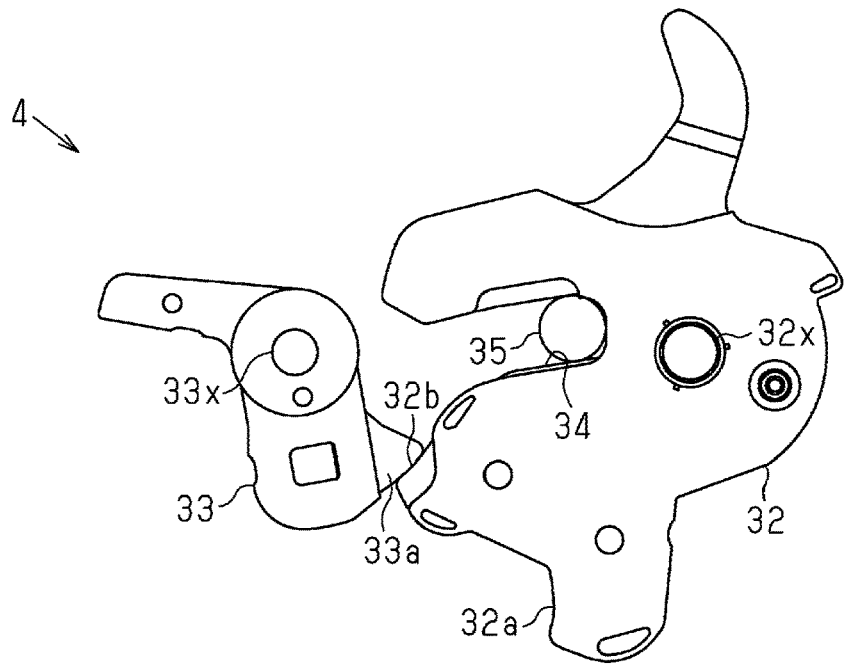
FIG. 4 is a diagram illustrating a latch mechanism in a fully-latched state.

The pawl 33 of the latch mechanism 4 is urged counterclockwise by a pawl spring (not shown) in FIGS. 2 to 4. A distal end 33*a* of the pawl 33 slides in contact with a peripheral surface of the latch 32 as the urging force of the pawl spring pivots the pawl 33. The distal end 33*a* of the pawl 33 is also configured to be engaged with the peripheral surface of the latch 32 in a state in which the striker 35 is engaged with the striker engagement groove 34. This allows the latch mechanism 4 to hold the striker 35 in a state engaged with the striker engagement groove 34 of the latch 32.

As shown in FIGS. 2 and 3, the striker 35 engaged with the striker engagement groove 34 pushes and moves relative to the latch 32 into the striker engagement groove 34. This pivots the latch 32 counterclockwise against the urging force of the latch spring in FIGS. 2 to 4.

More specifically, the distal end 33*a* of the pawl 33 is pressed against the peripheral surface of the latch 32 by the urging force of the pawl spring and virtually abuts and slides on the peripheral surface of the latch 32. Then, the distal end 33*a* of the pawl 33 engages a first engagement portion 32*a* of the latch 32 defined on the peripheral surface of the latch 32 (half-latched position). This restricts pivoting of the latch 32 in the clockwise direction and holds the striker 35 in a state engaged with the latch 32 (half-latched state). That is, disengagement of the striker 35 from the striker engagement groove 34 is restricted.

As shown in FIGS. 3 and 4, the latch 32 of the latch mechanism 4 can be further pivoted counterclockwise from a pivot position that corresponds to the half-latched state against the urging force of the latch spring. The latch 32 of the latch mechanism 4 is configured to be pivoted in a closing direction from the half-latched position by an operation force applied by the user to the sliding door 1 or a driving force of a closer device (40), which will be described below. Actuation of the closer device is controlled by a lock control signal Slk output from the door ECU 15. The pivoting of the latch 32 engages the pawl 33 with a second engagement portion 32*b* defined on the peripheral surface of the latch 32 (fully-latched position). The latch mechanism 4 is configured to shift to the fully-latched state in which the striker 35 engaged with the engagement groove 34 of the latch 32 is immovably constrained.

The pawl 33 of the latch mechanism 4 is configured to rotate clockwise against the urging force of the pawl spring based on an operation force applied to the door handle 6 or the driving force of the closer device (40) in FIGS. 2 to 4. The latch 32 is pivoted in a releasing direction (clockwise in FIGS. 2 to 4) based on the urging force of the latch spring when the pivoting restriction resulting from engagement with the pawl 33 is canceled. This releases the constrained striker 35 and disengages the striker 35 from the striker engagement groove 34 so that the latch mechanism 4 returns to an unlock state as shown in FIG. 2.

Figure 5:
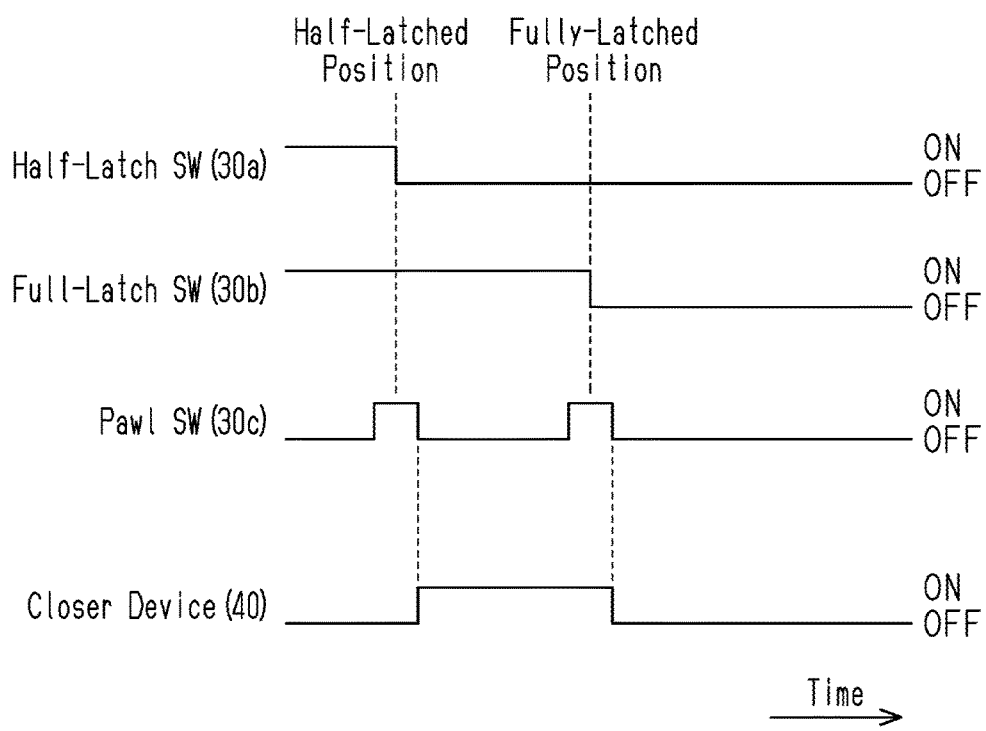
FIG. 5 is a diagram illustrating operations of a half-latch switch, a full-latch switch, and a pawl switch arranged in a lock device.

As shown in FIG. 5, the lock device 5 operates in cooperation with such engagement actions of the latch mechanism 4 and changes on/off states of a half-latch switch 30*a*, a full-latch switch 30*b*, and a pawl switch 30*c*, that is, output signals Swa to Swc of the sensor switches 30.

Specifically, when the pawl 33 is engaged with the first engagement portion 32*a* of the latch 32 as the latch mechanism 4 shifts from the unlatched state to the half-latched state (FIGS. 2 and 3), the pawl switch 30*c* changes from an off state to an on state and further from the on state to the off state in cooperation with the movement (back and forth pivoting) of the pawl 33, which slides on the peripheral surface of the latch 32. In other words, the pawl switch 30*c* is configured to be on when the pawl 33 is pivoted away from the latch 32. The half-latch switch 30*a* is configured to change from the on state to the off state at a time between when the pawl switch 30*c* is on and when the pawl switch 30*c* is off.

When the pawl 33 is engaged with the second engagement portion 32*b* of the latch 32 as the latch mechanism 4 shifts from the half-latched state to the fully-latched state (FIGS. 3 and 4), the pawl switch 30*c* also changes from the off state to the on state and further from the on state to the off state in cooperation with the movement of the pawl 33. The full-latch switch 30*b* is configured to change from the on state to the off state at a time between when the pawl switch 30*c* is on and when the pawl switch 30*c* is off.

The door ECU 15 detects the engagement state of the latch mechanism 4 based on output signals Swa to Swc indicative of the on/off states of the half-latch switch 30*a*, the full-latch switch 30*b*, and the pawl switch 30*c*. The door ECU 15 actuates the closer device 40 when the half-latch switch 30*a* has changed from an on state to an off state and the pawl switch 30*c* changes from an on state to an off state. The door ECU 15 stops driving the latch 32 with the closer device 40 when the full-latch switch 30*b* has changed from an on state to an off state and the pawl switch 30*c* changes from an on state to an off state.

Lock Device

The lock devices 5 arranged in the power sliding door device 20, specifically, the rear lock 5*b* of the full-close lock will now be described.

Figure 6:
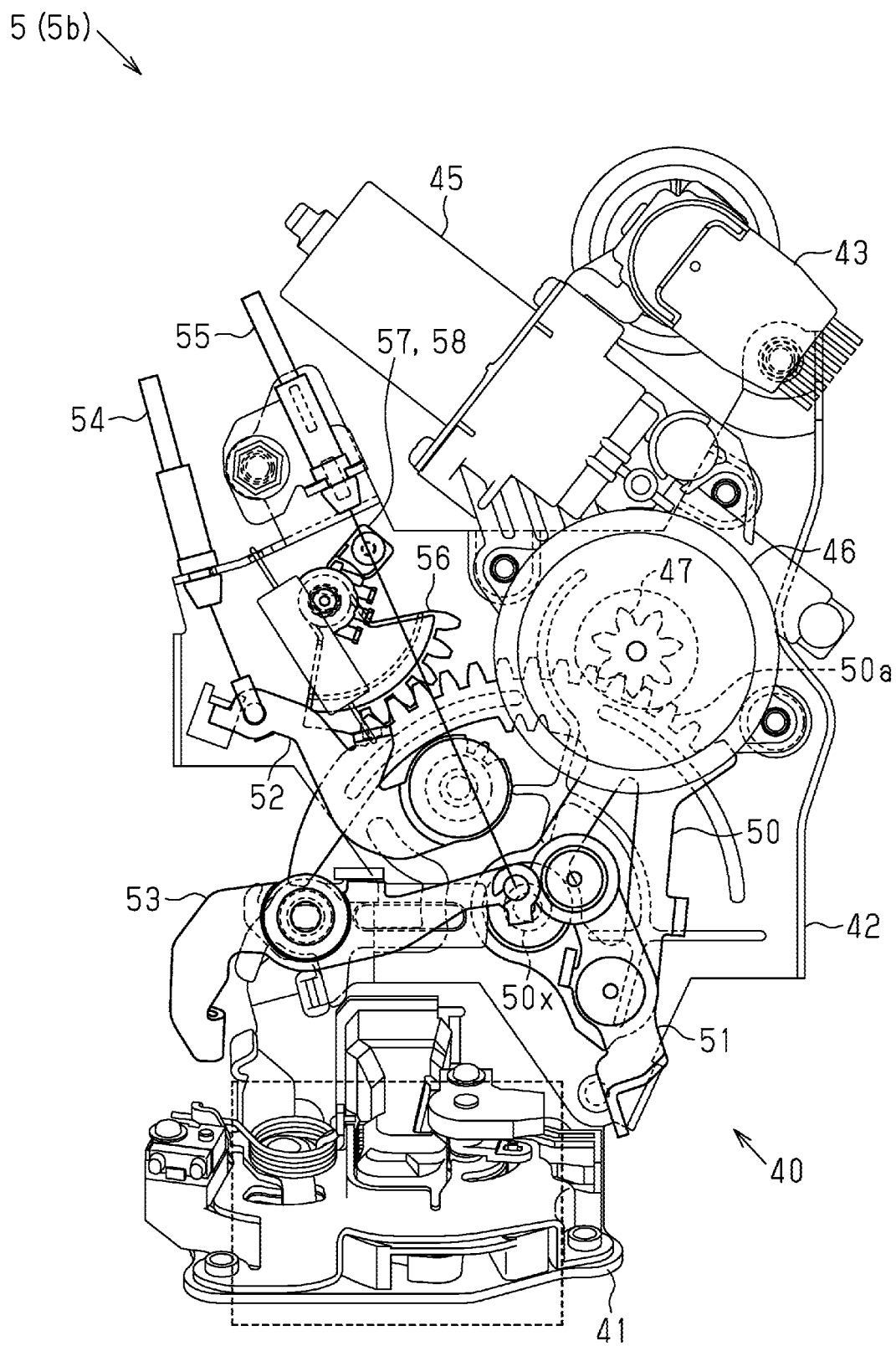
FIG. 6 is a side view of a lock device including a closer device.

As shown in FIG. 6, in the lock device 5(5*b*), the latch mechanism 4 is held by a base plate 41, which has a slit-shaped striker groove (not shown). A holding bracket 42 is fixed to the base plate 41. The lock device 5 includes a lock actuator 43, which is held by the holding bracket 42.

Specifically, the lock actuator 43 is configured as a geared motor integrating a motor 45, which serves as a drive source, and a reduction gear 46. The lock actuator 43 outputs rotation of the motor 45, which is reduced in speed by the reduction gear 46, from a pinion gear 47, which serves as an output portion. The lock device 5 also includes an active lever 50 that has a gear portion 50*a* meshed with the pinion gear 47. That is, the active lever 50 is driven by the lock actuator 43 and pivoted about a support shaft 50*x*. The lock device 5 includes the closer device 40 that is configured to perform a closing action and a releasing action with the latch mechanism 4 in accordance with the pivoting direction of the active lever 50.

Figure 7:
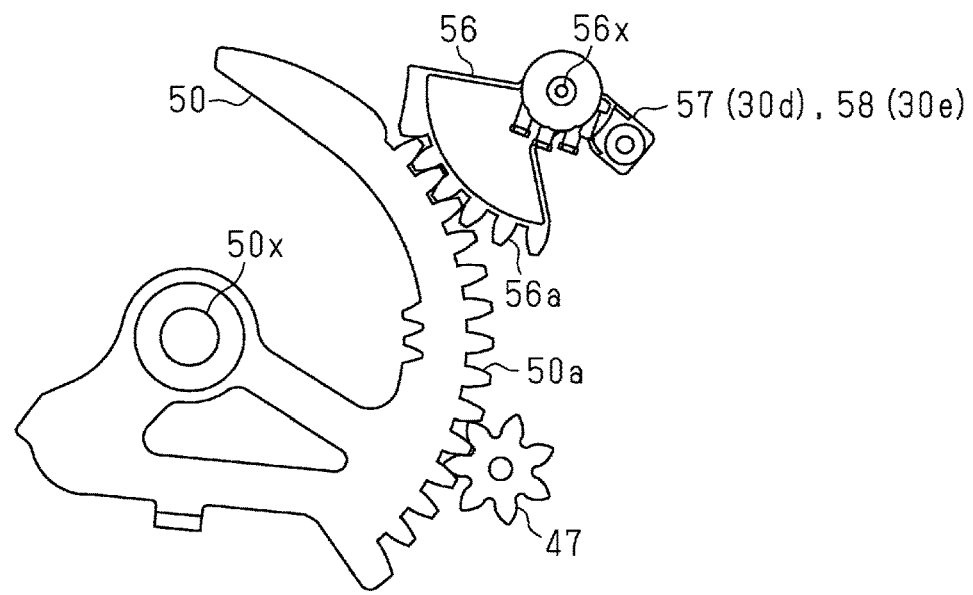
FIG. 7 is a diagram illustrating the movement of an active lever during a normal situation.
Figure 8:
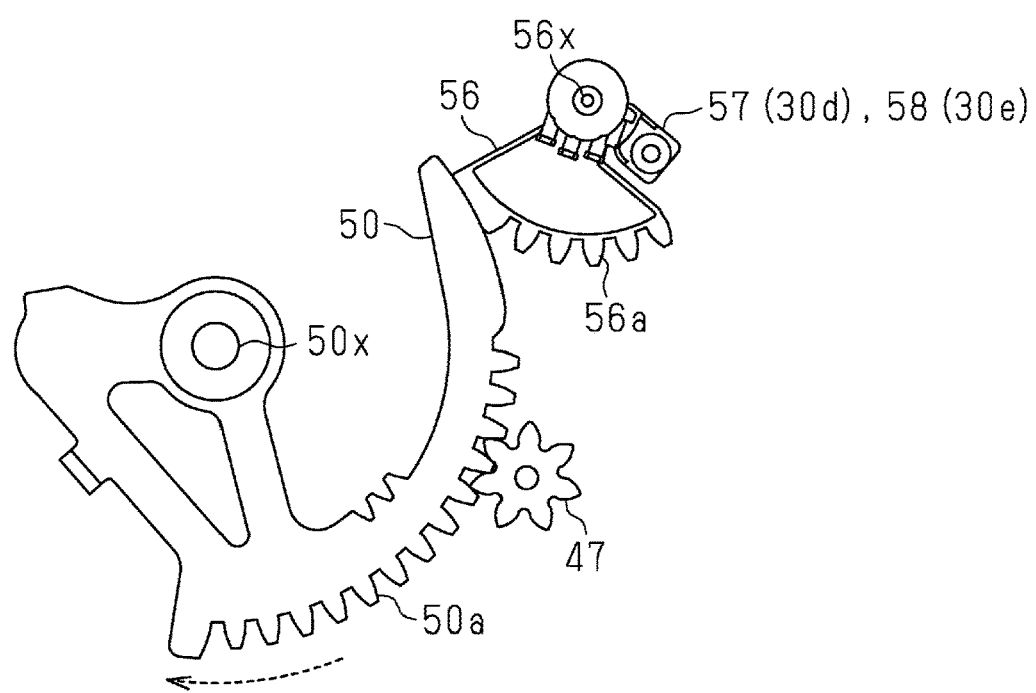
FIG. 8 is a diagram illustrating the movement of the active lever during a closing action.
Figure 9:
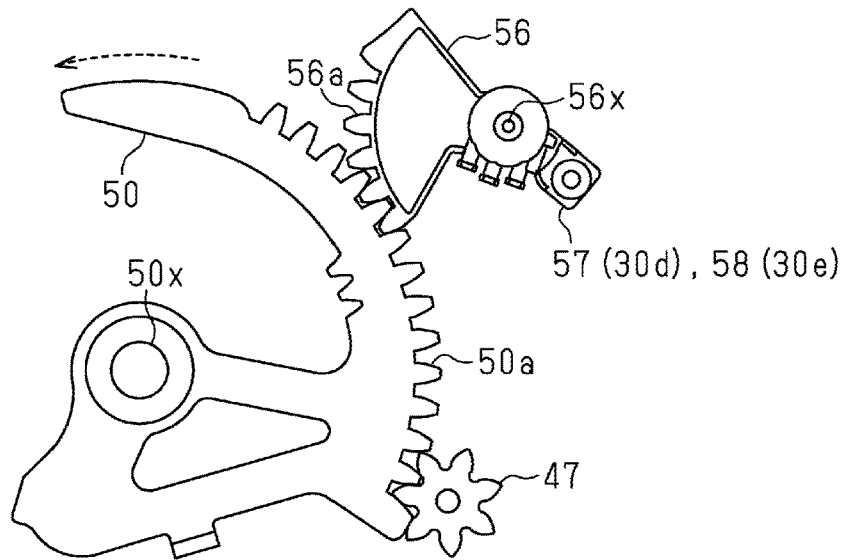
FIG. 9 is a diagram illustrating the movement of the active lever during a releasing action.

Specifically, as shown in FIGS. 7 to 9, the active lever 50, which serves as a pivot member, is pivoted in a first direction (clockwise in FIGS. 7 to 9) and a second direction (counterclockwise in FIGS. 7 to 9), which is opposite to the first direction, by a driving force of the lock actuator 43. The closer device 40 performs a closing action with the latch mechanism 4 when the active lever 50 is pivoted in the first direction from a neutral position (standby position) (refer to FIGS. 3 and 4), and the closer device 40 performs a releasing action with the latch mechanism 4 when the active lever 50 is pivoted in the second direction from the neutral position (refer to FIGS. 4 and 2).

As shown in FIG. 6, the closer device 40 includes a closing lever 51 pivoted in cooperation with the active lever 50 when the active lever 50 is pivoted in the first direction (clockwise in FIG. 6). The lock device 5 is configured so that the latch mechanism 4 performs a closing action based on the movement of the closing lever 51.

The closer device 40 also includes a releasing lever 52 pivoted in cooperation with the active lever 50 when the active lever 50 is pivoted in the second direction (counterclockwise in FIG. 6). The lock device 5 includes an opening lever 53 pivoted in cooperation with the releasing lever 52.

The releasing lever 52 of the lock device 5 is connected to a wire cable 54 that extends to the remote controller 7. The opening lever 53 is connected to a wire cable 55 that extends to the remote controller 7. The driving force of the lock actuator 43, which pivots the active lever 50 in the second direction, is transmitted from the releasing lever 52 to the opening lever 53 by the remote controller 7. In the lock device 5, the latch mechanism 4 performs the releasing action based on the movement of the opening lever 53.

After a closing action or a releasing action is completed, the active lever 50 of the closer device 40 is returned to the neutral position based on the actuation of the lock actuator 43. This prepares the closer device 40 for the next closing action and releasing action.

The door ECU 15 detects that the closing action of the latch mechanism 4 has been completed when the full-latch switch 30*b* changes from an on state to an off state and the pawl switch 30*c* changes from an on state to an off state as shown in FIG. 5. When the latch mechanism 4 performs a releasing action, the full-latch switch 30*b* first changes from an off state to an on state and then the half-latch switch 30*a* changes from an off state to an on state. The door ECU 15 detects that a releasing action of the latch mechanism 4 has been completed based on the changes in the output signals.

More specifically, the lock device 5 includes first and second neutral switches 30*d*, 30*e* that change on/off states in accordance with a pivot position P of the active lever 50 of the closer device 40 as shown in FIG. 10. The door ECU 15 is configured to detect the actuation state of the closer device 40 based on output signals Swd, Swe of the first and second neutral switches 30*d*, 30*e* as shown in FIG. 1.

As shown in FIGS. 7 to 9, the pinion gear 47 of the lock actuator 43 is meshed with the active lever 50 (specifically, gear portion 50*a* of active lever 50). The lock device 5 includes a neutral switch lever 56 that has a gear portion 56*a* meshed with the active lever 50 (specifically, gear portion 50*a* of active lever 50). That is, the neutral switch lever 56 is pivoted about a support shaft 56*x* in cooperation with the active lever 50. The neutral switches 30*d*, 30*e* employ rotary switches 57, 58 that change on/off states when the neutral switch lever 56 is pivoted.

Figure 10A:
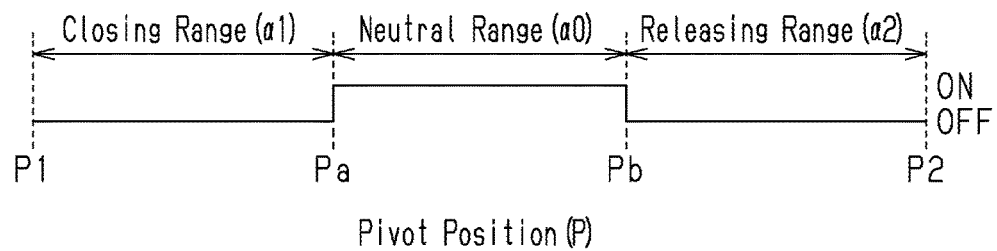
FIG. 10A is a diagram illustrating the movement of a first neutral switch arranged in the lock device.

As shown in FIG. 10A, on/off states of the first neutral switch 30*d* change at two state change points (first and second state change points Pa, Pb). The active lever 50 is pivoted from a first pivot end P1 to a second pivot end P2 in the second direction and pivoted from the second pivot end P2 to the first pivot end P1 in the first direction. The two state change points Pa, Pb are pivot positions P of the active lever 50 between the first pivot end P1 and the second pivot end P2. Specifically, the first neutral switch 30*d* is in an off state when the pivot position P of the active lever 50 is between the first pivot end P1 and the first state change point Pa and in an on state when the pivot position P of the active lever 50 is between the first state change point Pa and the second state change point Pb. Further, the first neutral switch 30*d* is in an off state when the pivot position P of the active lever 50 is between the second state change point Pb and the second pivot end P2. As shown in FIG. 10A, the range of movement of the active lever 50 includes a closing range α1 defined between the first pivot end P1 and the first state change point Pa, a neutral range α0 defined between the first state change point Pa and the second state change point Pb, and a releasing range α2 defined between the second state change point Pb and the second pivot end P2.

Figure 10B:
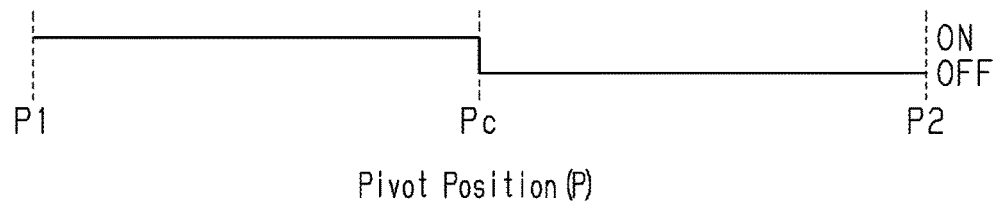
FIG. 10B is a diagram illustrating the movement of a second neutral switch arranged in the lock device.

As shown in FIG. 10B, on/off states of the second neutral switch 30*e* change at a single state change point (third state change point Pc) in the neutral range α0. Specifically, the second neutral switch 30*e* is in an on state when the pivot position P of the active lever 50 is between the first pivot end P1 and the third state change point Pc. The second neutral switch 30*e* is in the off state when the pivot position P of the active lever 50 is between the third state change point Pc and the second pivot end P2.

The latch mechanism 4 performs a closing action as the pivot position P of the active lever 50 moves towards the first pivot end P1 and a releasing action as the pivot position P of the active lever 50 moves toward the second pivot end P2. The first state change point Pa, the second state change point Pb, and the third state change point Pc differ from one another. The door ECU 15 uses the second neutral switch 30*e* as a backup for the first neutral switch 30*d*.

Specifically, the door ECU 15 pivots the active lever 50 of the closer device 40 in the first direction and performs a closing action with the latch mechanism 4 in the closing control. The door ECU 15 pivots the active lever 50 of the closer device 40 in the second direction and performs a releasing action with the latch mechanism 4 in the releasing control.

Figure 11:
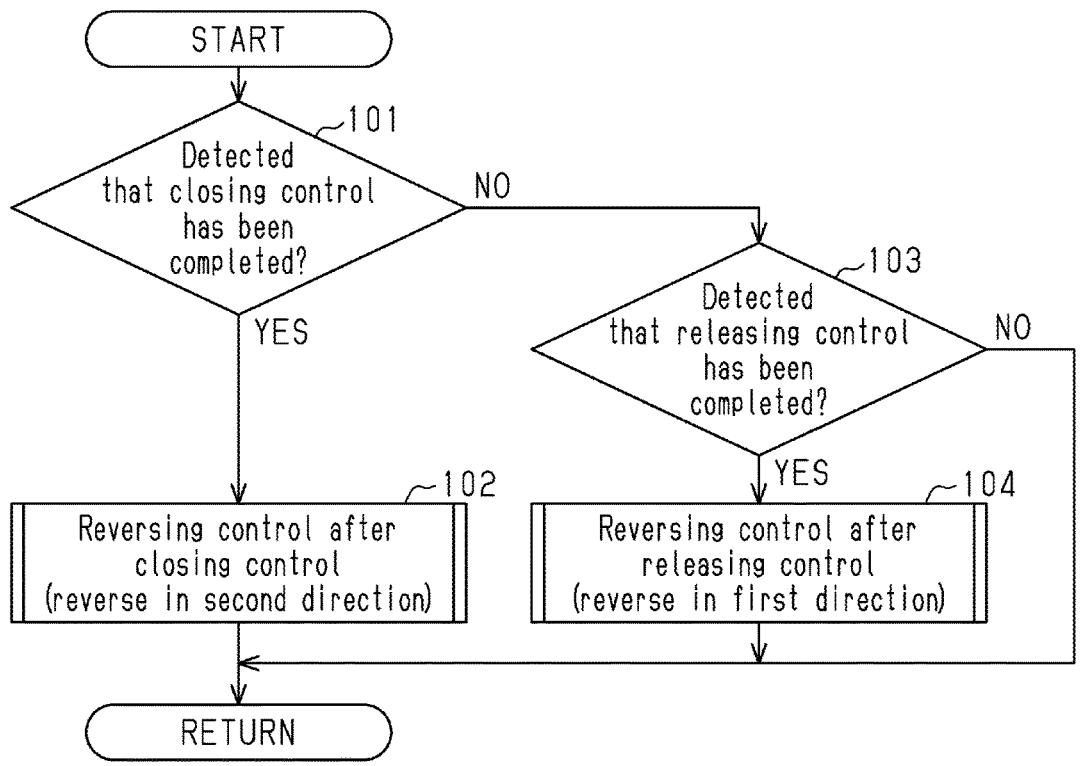
FIG. 11 is a flowchart showing the procedure of reversing control.

As shown in the flowchart of FIG. 11, if the door ECU 15 detects that the closing control has been completed (step 101: YES), the door ECU 15 reverses the active lever 50 of the closer device 40 in the second direction (reversing control after closing control, step 102). If the door ECU 15 detects that the releasing control has been completed (step 103: YES), the door ECU 15 reverses the active lever 50 of the closer device 40 in the first direction (reversing control after releasing control, step 104). The door ECU 15 is configured to move the active lever 50 so that the pivot position P is located inside the neutral range α0 shown in FIG. 10A or closer to the neutral range α0 during the reversing control.

Figure 12:
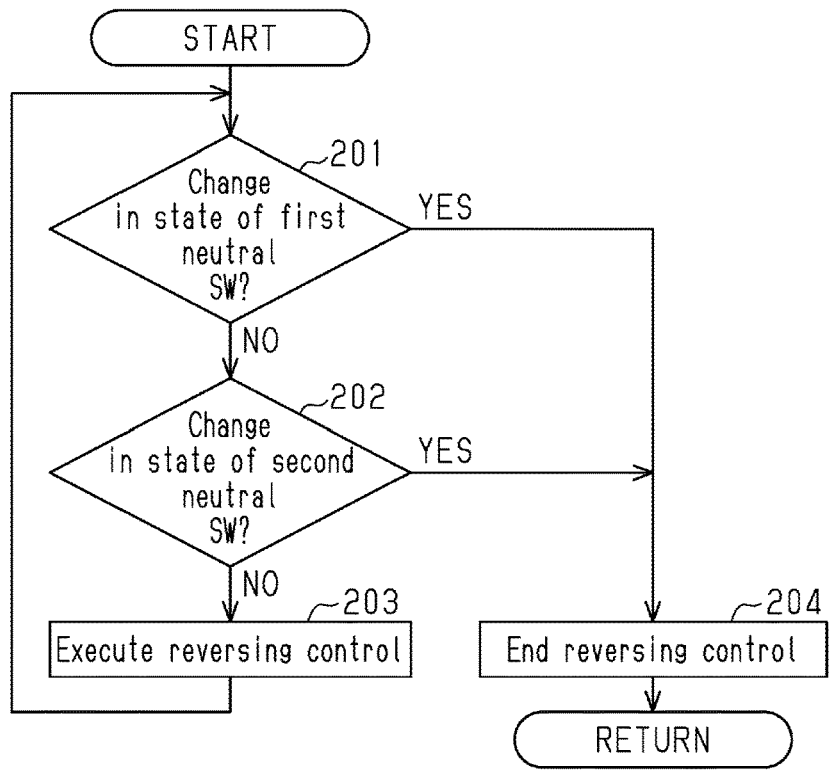
FIG. 12 is a flowchart showing the procedure of reversing control.

Specifically, as shown in the flowchart of FIG. 12, the door ECU 15 monitors a change in on/off states of the first and second neutral switches 30d, 30e to reverse the active lever 50 (steps 201 to 203). If there is no change in on/off states of the first and second neutral switches 30d, 30e (step 201: NO and step 202: NO), the door ECU 15 continues the reverse pivoting (execute reversing control, step 203).

The first neutral switch 30d is in an off state when the closing control has been completed and when the releasing control has been completed (refer to FIG. 10A). Accordingly, if the door ECU 15 detects a change in the on/off state of the first neutral switch 30d corresponding to reverse pivoting of the active lever 50 passing the first state change point Pa or the second state change point Pb, that is, if the door ECU 15 detects a change from an off state to an on state (step 201: YES), the door ECU 15 stops the reverse pivoting (end reversing control, step 204). This positions the active lever 50 at the pivot position P between the first and second state change points Pa, Pb, which define the neutral range α0.

Further, if the door ECU 15 detects a change in the on/off state of the second neutral switch 30e corresponding to reverse pivoting of the active lever 50 passing the third state change point Pc (step 202: YES), the door ECU 15 stops the reverse pivoting (step 204). That is, the second neutral switch 30e of the lock device 5 is in an on state when the closing control has been completed and in an off state when the releasing control has been completed. The third state change point Pc where the on/off states of the second neutral switch 30e change is set between the first and second state change points Pa, Pb.

Thus, even if the door ECU 15 cannot detect the active lever 50 passing the first state change point Pa during the reversing control after the closing control due to an anomaly in the first neutral switch 30d, the door ECU 15 stops the reverse pivoting when an output signal Swe of the second neutral switch 30e changes from an on state to an off state (refer to FIG. 10B). Likewise, even if the door ECU 15 cannot detect the active lever 50 passing the second state change point Pb during the reversing control after the releasing control, the door ECU 15 stops the reverse pivoting when an output signal Swe of the second neutral switch 30e changes from an off state to the on state. This obtains a high level of reliability for the lock device 5.

Figure 13:
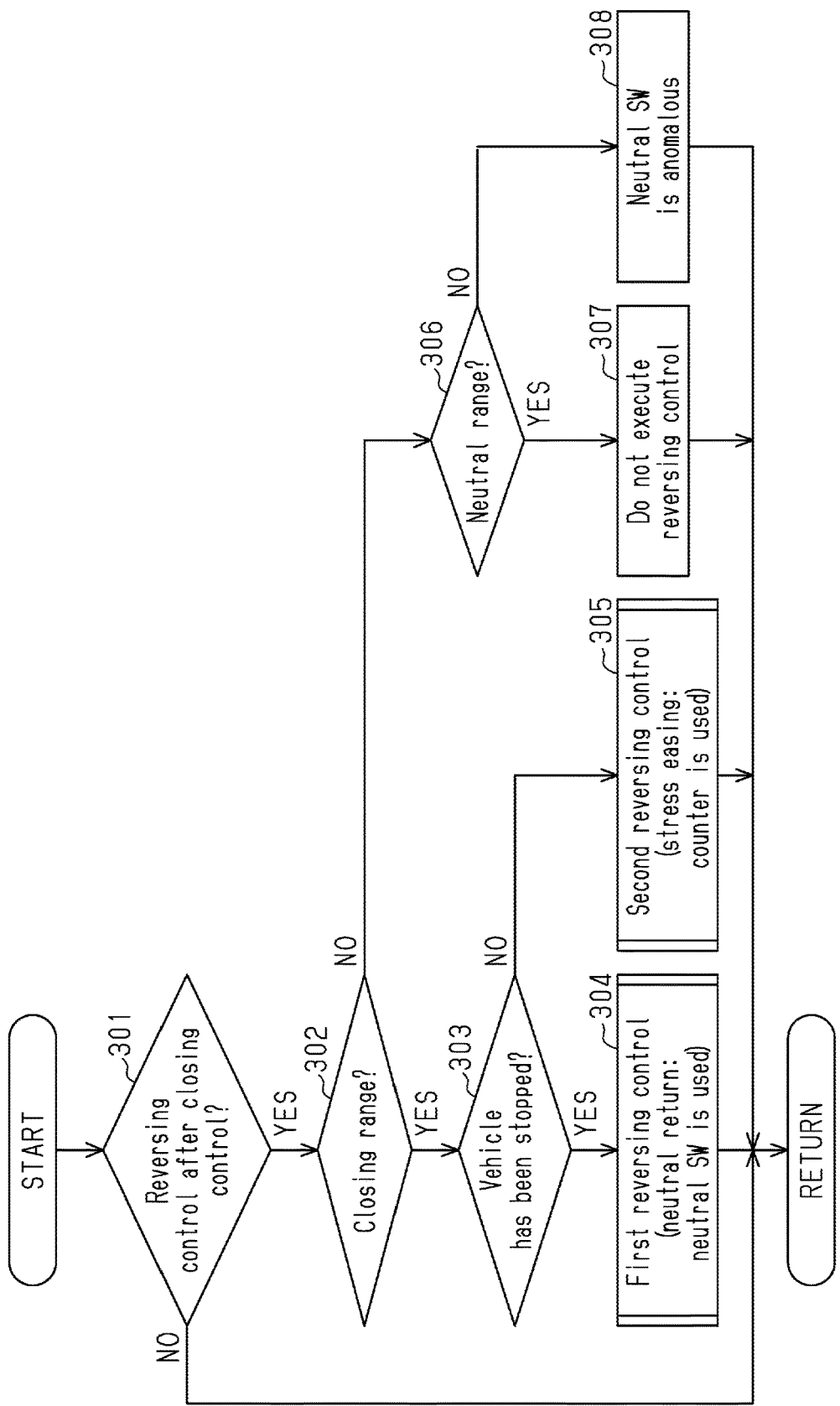
FIG. 13 is a flowchart showing the procedure of reversing control after closing control.

More specifically, as shown in the flowchart of FIG. 13, during the reversing control after the closing control (step 301: YES), if the door ECU 15 determines that the pivot position P of the active lever 50 is in the closing range α1 (step 302: YES), the door ECU 15 determines whether the vehicle has been stopped (step 303). If the door ECU 15 determines that the vehicle has been stopped (step 303: YES), the door ECU 15 executes a first reversing control that stops the reverse pivoting of the active lever 50 based on changes in the on/off states of the first and second neutral switches 30d, 30e as shown in FIG. 12 (step 304).

In step 303, if the door ECU 15 determines that the vehicle has not been stopped, that is, the vehicle is traveling (step 303: NO), the door ECU 15 executes a second reversing control that stops the reverse pivoting of the active lever 50 using a time measuring counter 60a, which serves as a reversing counter (step 305, refer to FIG. 1).

In other words, the first reversing control executed in step 304 is neutral return control executed in a normal situation to arrange the active lever 50 so that the pivot position P is inside the neutral range α0. In contrast, the second reversing control executed in step 305 corresponds to stress easing control executed to release stress applied to the latch mechanism 4 in the closing action. Preferably, when the vehicle is traveling, there should be no possibility of cancellation of the constraint on the sliding door 1 applied by the latch mechanism 4. Accordingly, the door ECU 15 executes the second reversing control using the time measuring counter 60a so that the pivot position P of the active lever 50 moves toward the neutral range α0. The door ECU 15 sets a duration time (predetermined time T1) of the second reversing control. This obtains a high level of safety for the lock device 5.

Figure 14:
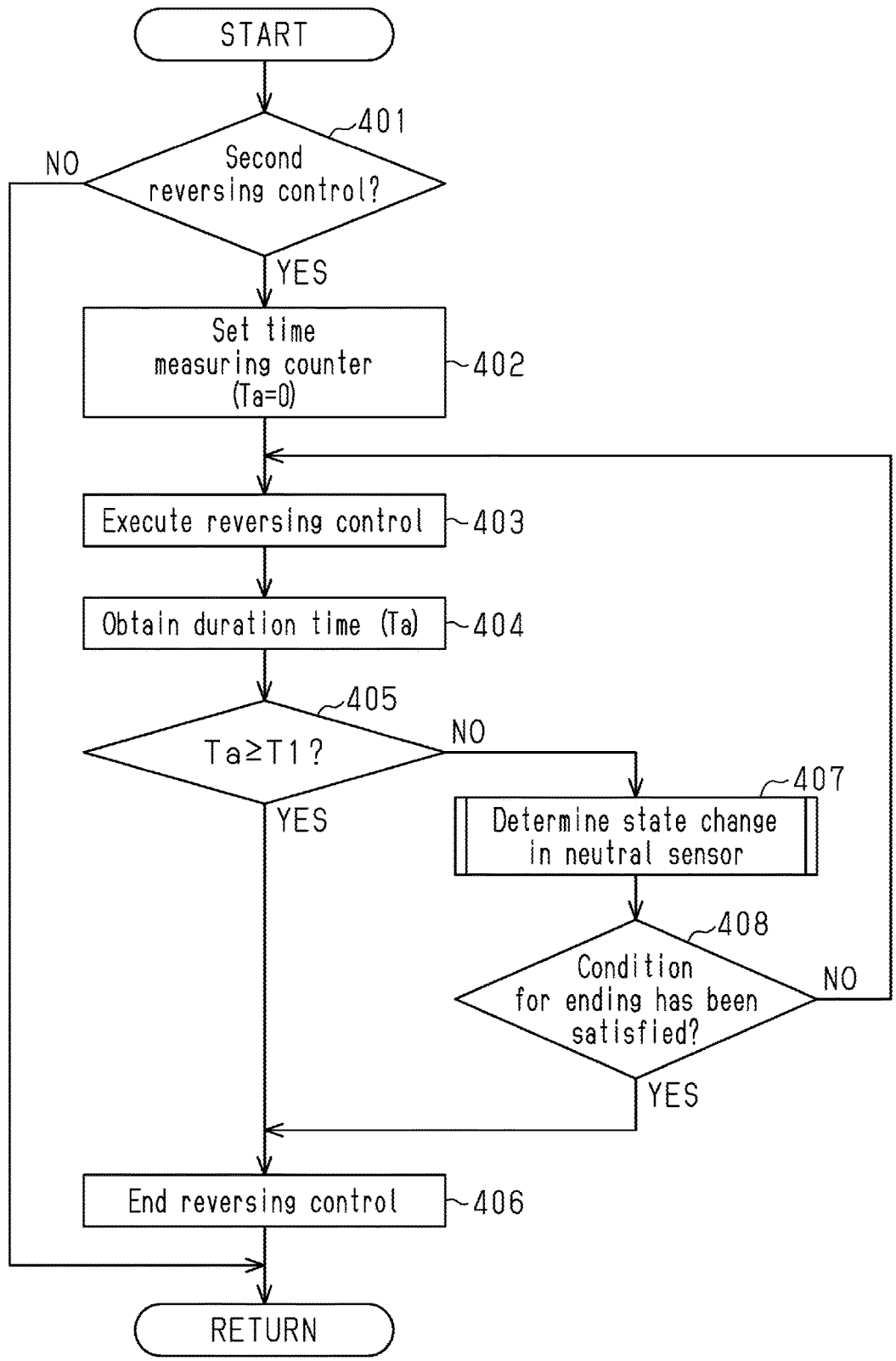
FIG. 14 is a flowchart showing the procedure of second reversing control.

Specifically, as shown in the flowchart of FIG. 14, when executing the second reversing control (step 401: YES), the door ECU 15 first sets the time measuring counter 60a (Ta=0, step 402). Then, the door ECU 15 reverses the active lever 50 of the closer device 40 in the second direction (execute reversing control, step 403).

The door ECU 15 obtains a duration time Ta, which is a count value of the time measuring counter 60a, (step 404) and determines whether the duration time Ta of the second reversing control has reached the predetermined time T1 (step 405). If the duration time Ta has reached the predetermined time T1 (Ta≥T1, step 405: YES), the door ECU 15 stops the reverse pivoting of the active lever 50 (end reversing control, step 406).

The door ECU 15 determines state changes in the neutral switches 30d, 30e when executing the second reversing control. Specifically, in step 405, if the door ECU 15 determines that the duration time Ta of the second reversing control has not reached the predetermined time T1 (Ta<T1, step 405: NO), the door ECU 15 determines state changes in the neutral switches 30d, 30e (step 407) in the same manner as the first reversing control (refer to FIG. 12, step 201 and step 202). If the door ECU 15 determines that a condition for ending the reversing control has been satisfied in the state change determination, specifically, if the door ECU 15 determines that the active lever 50 has moved from the closing range α1 to the neutral range α0 (step 408: YES), the door ECU 15 stops the reverse pivoting of the active lever 50 in step 406 in the same manner as when the duration time Ta has reached the predetermined time T1.

In step 408, if the door ECU 15 determines that the condition for ending the reversing control has not been satisfied based on the state change determination of the neutral switches 30d, 30e (step 408: NO), the door ECU 15 performs the process again from step 403. That is, the neutral switches 30d, 30e are used as backups to set a greater value for an amount of reverse pivoting with the time measuring counter 60a in the second reversing control, or the predetermined time T1 for reversely pivoting the active lever 50. Thus, the lock device 5 is configured so that the latch mechanism 4 can readily perform a releasing action in the next releasing control.

As shown in the flowchart of FIG. 13, if the door ECU 15 determines that the pivot position P of the active lever 50 is not in the closing range α1 in step 302 (step 302: NO), the door ECU 15 determines whether the pivot position P of the active lever 50 is in the neutral range α0 (step 306). If the door ECU 15 determines that the pivot position P of the active lever 50 is in the neutral range α0 (step 306: YES), the door ECU 15 does not execute the reversing control after the closing control (step 307).

A closing action may be performed with the latch mechanism 4 when the user manually closes the sliding door 1. Even if the neutral switches 30d, 30e are functioning normally and there is no error in the detection of the pivot position P, the active lever 50 may be in the neutral range α0 when the closing control has been completed. In such a case, the reversing control may move the active lever 50 to the releasing range α2.

Accordingly, the door ECU 15 does not execute the reversing control in such a case. This reduces the possibility of the active lever 50 being moved toward the releasing range α2 and a releasing action being performed with the latch mechanism 4 after the closing action is completed.

If the door ECU 15 determines in step 306 that the pivot position P of the active lever 50 is not in the neutral range α0 (step 306: NO), the door ECU 15 determines that the neutral switches 30d, 30e are anomalous (step 308). The lock device 5 outputs a warning by, for example, activating a warning lamp in order to prompt the occupant of the vehicle to be cautious.

Failure Detection of Neutral Switch

Detection of failure of the neutral switches 30d, 30e by the door ECU 15 will now be described.

Figure 15:
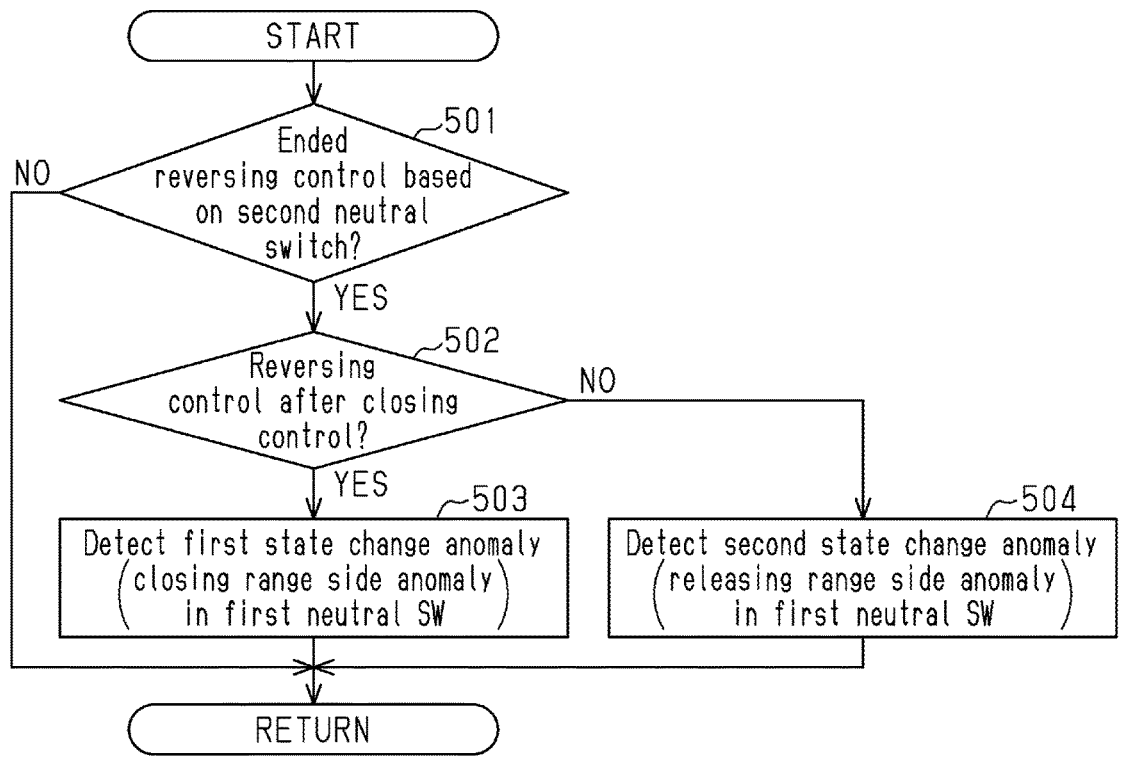
FIG. 15 is a flowchart showing the procedure for determining detection of an anomaly in a first neutral switch.

As shown in the flowchart of FIG. 15, if the door ECU 15 has ended the reversing control of the active lever 50 based on a change in the on/off state of the second neutral switch 30e (step 501: YES), the door ECU 15 determines whether the reversing control was executed after the closing control or the releasing control (step 502). If the reversing control was executed after the closing control (step 502: YES), the door ECU 15 detects the occurrence of an anomaly in the first neutral switch 30d in a region closer to the closing range α1 than the releasing range α2 as a closing range side anomaly or a first state change anomaly (step 503). If the reversing control was executed after the releasing control (step 502: NO), the door ECU 15 detects the occurrence of an anomaly in the first neutral switch 30d in a region closer to the releasing range α2 than the closing range α1 as a releasing range side anomaly or a second state change anomaly (step 504).

When the door ECU 15 detects a change in the on/off state of the second neutral switch 30e without detecting a change in the on/off state of the first neutral switch 30d during reversing control indicates that the on/off state of the first neutral switch 30d was not switched when the active lever 50 passed the first and second state change points Pa, Pb (refer to FIG. 10). The door ECU 15 detects such an anomaly in the first neutral switch 30d as a first state change anomaly and a second state change anomaly that are separate from each other. This detects failure of the first neutral switch 30d in an accurate and more ensured manner.

Figure 16:
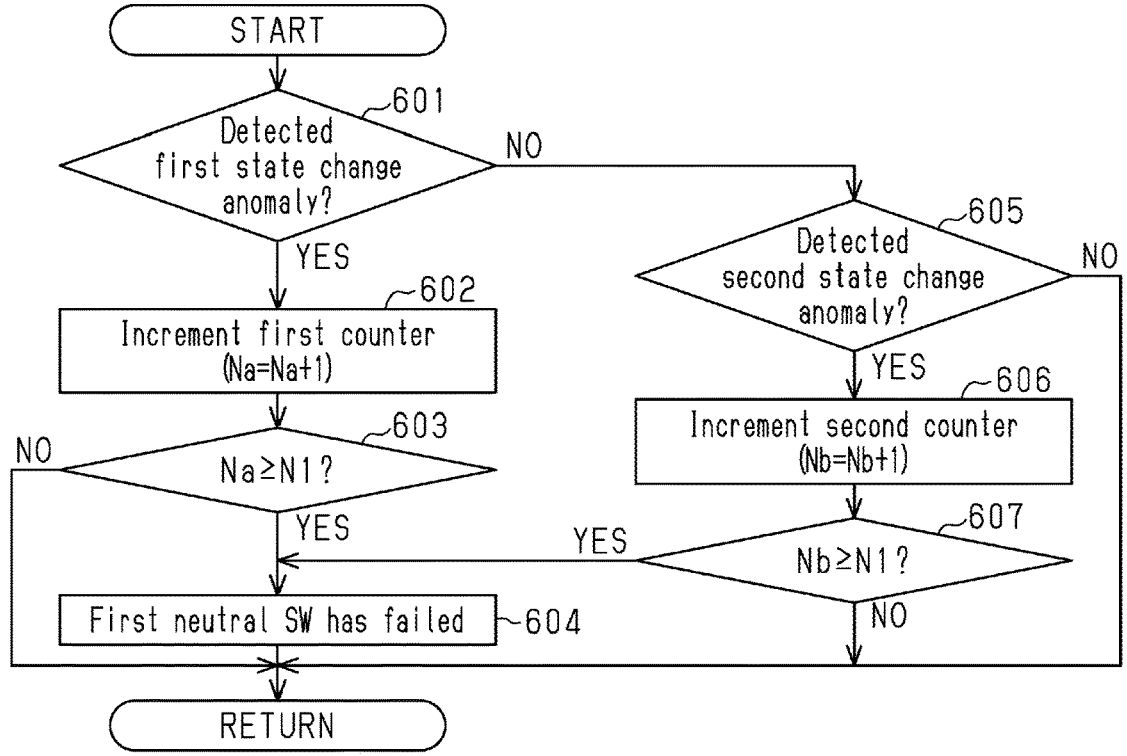
FIG. 16 is a flowchart showing the procedure for determining failure of the first neutral switch.

Specifically, as shown in the flowchart of FIG. 16, if the door ECU 15 detects a first state change anomaly in the first neutral switch 30d (step 601: YES, refer to FIG. 15, step 503), the door ECU 15 increments a first counter 70a (Na=Na+1, step 602). Next, the door ECU 15 determines whether the count value of the first counter 70a, specifically, the number Na of first state change anomalies has exceeded a predetermined threshold N1 (step 603). If the number Na of first state change anomalies has exceeded the predetermined threshold N1 (Na≥N1, step 603: YES), the door ECU 15 determines that the first neutral switch 30d, specifically, the rotary switch 57 of the first neutral switch 30d has failed (step 604).

Likewise, if the door ECU 15 detects a second state change anomaly in the first neutral switch 30d (step 605: YES, refer to FIG. 15, step 504), the door ECU 15 increments a second counter 70b (Nb=Nb+1, step 606). Next, the door ECU 15 determines whether the count value of the second counter 70b, specifically, the number Nb of second state change anomalies has exceeded a predetermined threshold N2 (step 607). If the number Nb of second state change anomalies has exceeded the predetermined threshold N1 (Nb≥N2, step 607: YES), the door ECU 15 determines that the first neutral switch 30d has failed in step 604.

Figure 17:
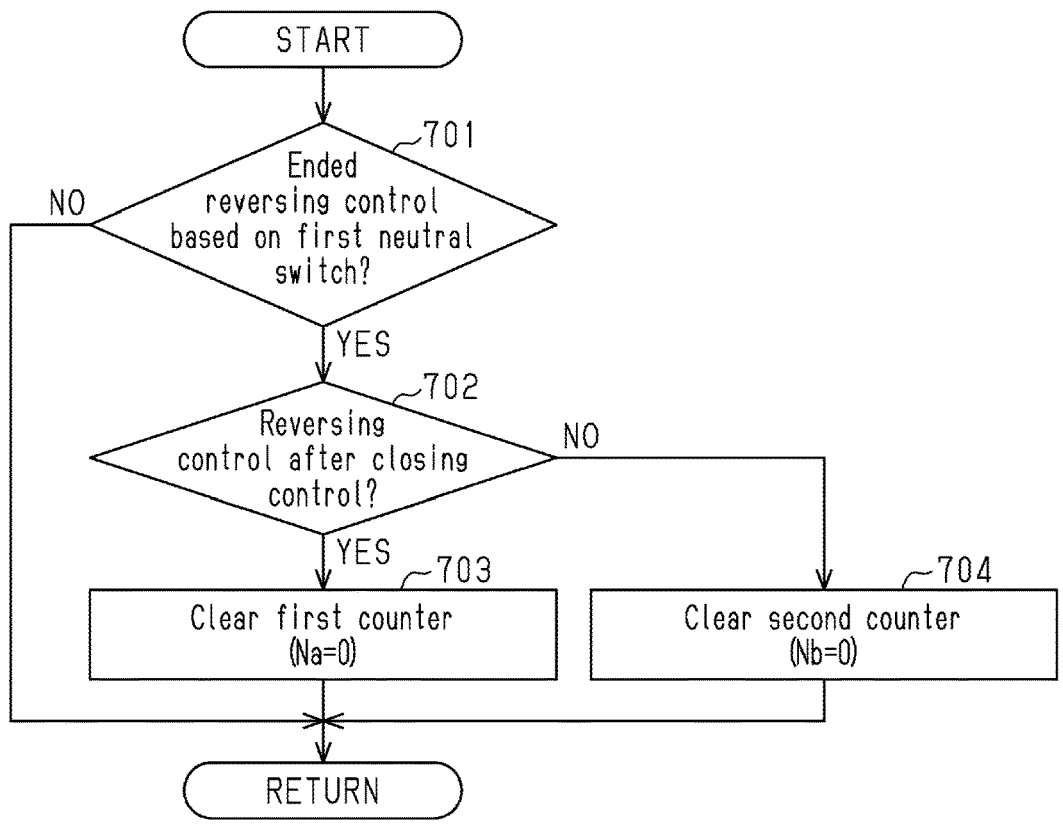
FIG. 17 is a flowchart showing the procedure for initializing a first counter and a second counter.

As shown in the flowchart of FIG. 17, if the door ECU 15 has ended the reversing control of the active lever 50 based on a change in the on/off state of the first neutral switch 30d (step 701: YES), the door ECU 15 determines whether the reversing control was executed after the closing control or the releasing control (step 702). If the reversing control was executed after the closing control (step 702: YES), the door ECU 15 initializes the number Na of first state change anomalies (counter is cleared, Na=0, step 703). If the reversing control was executed after the releasing control (step 702: NO), the door ECU 15 initializes the number Nb of second state change anomalies (counter is cleared, Nb=0, step 704).

Figure 18:
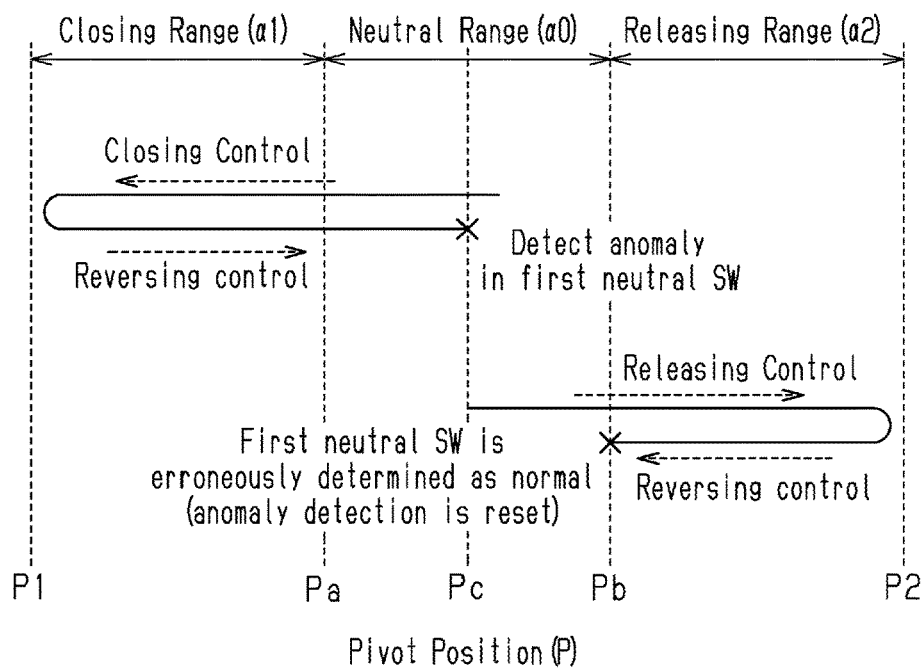
FIG. 18 is a diagram illustrating the determination of failure in a referential example.

As illustrated in the referential example of FIG. 18, during the reversing control after the closing control, the door ECU 15 may, for example, detect the occurrence of an anomaly in the first neutral switch 30d when the reversing control ends based on a change in the on/off state of the second neutral switch 30e (refer to FIG. 15, step 503). However, the referential example is configured to determine failure of a single physical component (rotary switch 57) in the first neutral switch 30d regardless of the direction of reverse pivoting of the active lever 50. Thus, if reverse pivoting of the active lever 50 is stopped based on a change in the on/off state of the first neutral switch 30d during the reversing control after the next releasing control, the door ECU 15 may erroneously determine that the first neutral switch 30d is normal.

Failure of an element in a significant vehicle component such as the lock device 5 is often detected when an anomaly is detected a number of times. Thus, the occurrence of a failure in the first neutral switch 30d may not be detected appropriately if different detection results (anomalous/normal) are alternately obtained because of the direction of reverse pivoting of the active lever 50.

Accordingly, the door ECU 15 separately counts the numbers Na, Nb of first and second state change anomalies in the first neutral switch 30d by using dedicated first and second counters 70a, 70b. This appropriately detects failure of the first neutral switch 30d.

Figure 19:
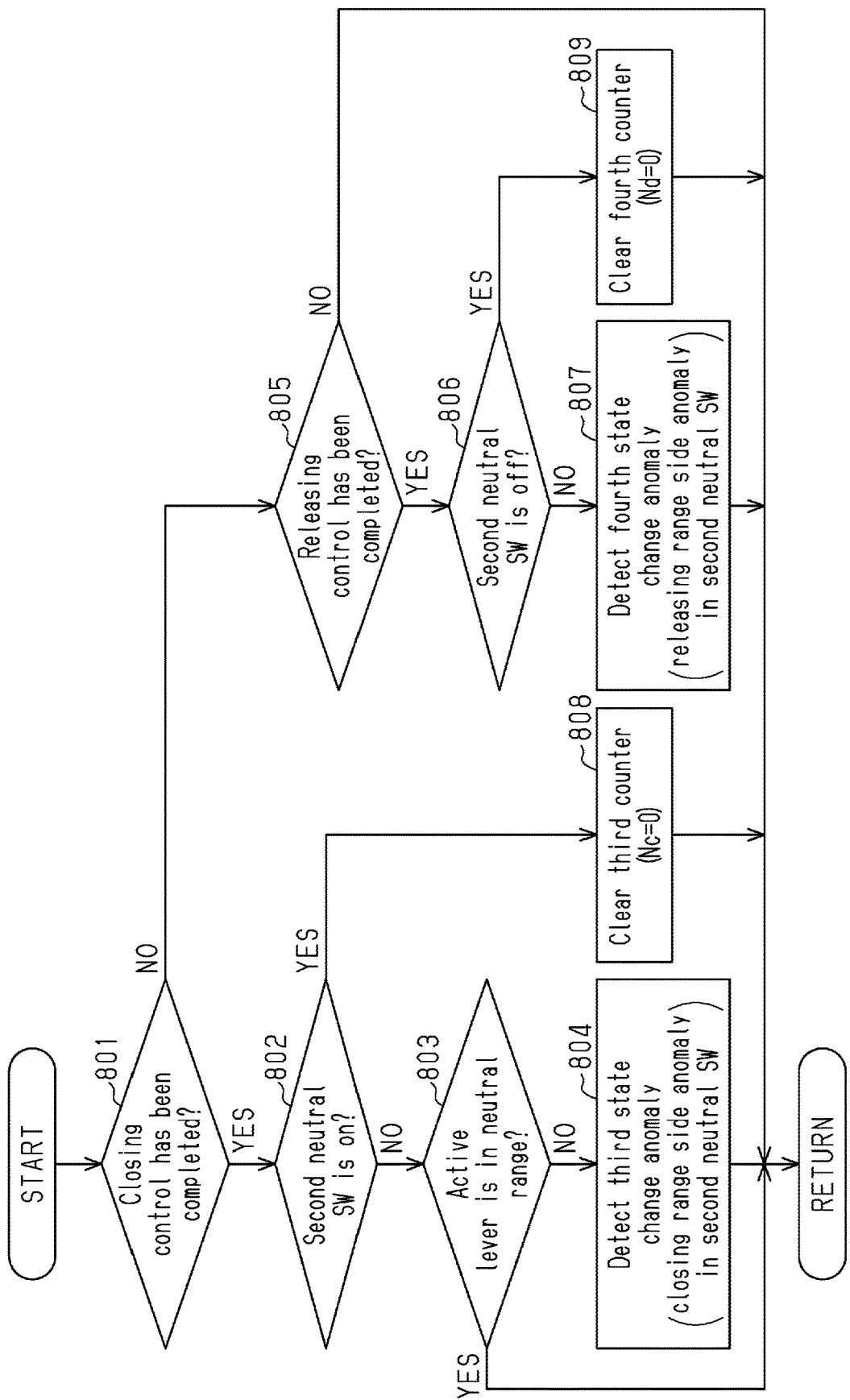
FIG. 19 is a flowchart showing the procedure for determining detection of an anomaly in a second neutral switch.

As shown in the flowchart of FIG. 19, when the closing control has been completed (step 801: YES), the door ECU 15 determines whether the second neutral switch 30e is on (step 802). If the door ECU 15 determines that the second neutral switch 30e is off in step 802 (step 802: NO), the door ECU 15 determines whether the pivot position P of the active lever 50 is between the first and second state change points Pa, Pb of the first neutral switch 30d, namely, in the neutral range α0 (step 803). If the door ECU 15 determines that the pivot position P of the active lever 50 is not in the neutral range α0 (step 803: NO), the door ECU 15 detects the occurrence of an anomaly in the second neutral switch 30e in a region closer to the closing range α1 than the releasing range α2 as a closing range side anomaly or a third state change anomaly (step 804).

When the releasing control has been completed (step 805: YES), the door ECU 15 determines whether the second neutral switch 30e is in an off state (step 806). If the door ECU 15 determines that the second neutral switch 30e is in an on state in step 806 (step 806: NO), the door ECU 15 detects the occurrence of an anomaly in the second neutral switch 30e in a region closer to the releasing range α2 than the closing range α1 as a releasing range side anomaly or a fourth state change anomaly (step 807).

If the second neutral switch 30e (rotary switch 58) is normal, the second neutral switch 30e is in an on state when the closing control has been completed and in an off state when the releasing control has been completed (refer to FIG. 10). Accordingly, the door ECU 15 is configured to separately detect a third state change anomaly and a fourth state change anomaly in the second neutral switch 30e.

When the user manually closes the sliding door 1, as described above, the closing control may be completed even if the pivot position P of the active lever 50 is in the neutral range α0. Accordingly, when the closing control has been completed, if the pivot position P of the active lever 50 is in the neutral range α0 (step 803: YES), the door ECU 15 does not detect a third state change anomaly. This improves the detection accuracy of the third state change anomaly.

Figure 20:
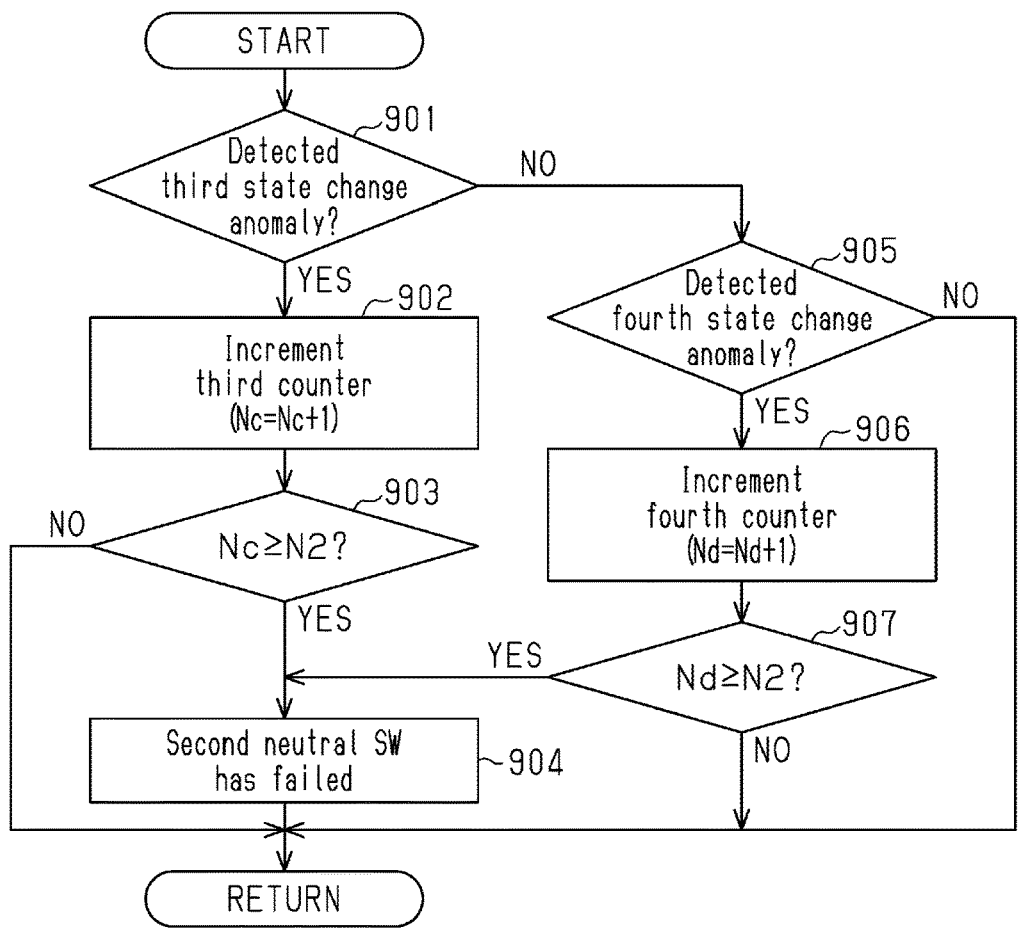
FIG. 20 is a flowchart showing the procedure for determining failure of the second neutral switch.

As shown in the flowchart of FIG. 20, if the door ECU 15 detects a third state change anomaly in the second neutral switch 30e (step 901: YES, refer to FIG. 19, step 804), the door ECU 15 increments a third counter 70c (Nc=Nc+1, step 902). Next, the door ECU 15 determines whether the count value of the third counter 70c, specifically, the number Nc of third state change anomalies has exceeded the predetermined threshold N2 (step 903). If the number Nc of third state change anomalies has exceeded the predetermined threshold N2 (Nc≥N2, step 903: YES), the door ECU 15 determines that the second neutral switch 30e, specifically, the rotary switch 58 of the second neutral switch 30e has failed (step 904).

Likewise, if the ECU 15 detects a fourth state change anomaly in the second neutral switch 30e (step 905: YES, refer to FIG. 19, step 807), the door ECU 15 increments a fourth counter 70d (Nd=Nd+1, step 906). Next, the door ECU 15 determines whether the count value of the fourth counter 70d, specifically, the number Nd of fourth state change anomalies has exceeded the predetermined threshold N2 (step 907). If the number Nd of fourth state change anomalies has exceeded the predetermined threshold N2 (Nd≥N2, step 907: YES), the door ECU 15 determines that the second neutral switch 30e has failed in step 904.

As shown in FIG. 19, when the closing control has been completed (step 801: YES), if the second neutral switch 30e is in an on state (step 802: YES), the door ECU 15 initializes the number Nc of third state change anomalies (counter is cleared, Nc=0, step 808). When the releasing control has been completed (step 805: YES), if the second neutral switch 30e is in an off state (step 806: YES), the door ECU 15 initializes the number Nd of fourth state change anomalies (counter is cleared, Nd=0, step 809).

In the lock device 5, the second neutral switch 30e serves as a backup for the first neutral switch 30d. Thus, a method using two neutral switches to backup each other and detect an anomaly in the other switch like in the related art cannot be employed by the lock device 5. If the second neutral switch 30e has failed, the active lever 50 may move beyond the neutral range α0.

The second neutral switch 30e is configured to change on/off states at the third state change point Pc, which is set between the first pivot end P1 and the second pivot end P2 of the active lever 50. Thus, even if one of the third state change anomaly and the fourth state change anomaly occurs, the other one of the third state change anomaly and the fourth state change anomaly will not occur in many cases (on state is fixed or off state is fixed).

Accordingly, the door ECU 15 separately detects the occurrence of a third state change anomaly and a fourth state change anomaly in the second neutral switch 30e. Further, the door ECU 15 separately counts the numbers Nc, Nd of third and fourth state change anomalies by using the third and fourth dedicated counters 70c, 70d. This avoids a situation in which an anomaly detection and a normal detection are alternately obtained because of the direction of reverse pivoting of the active lever 50.

Re-reversing Control

Re-reversing control performed by the door ECU 15 after the reversing control will now be described.

Figure 21:
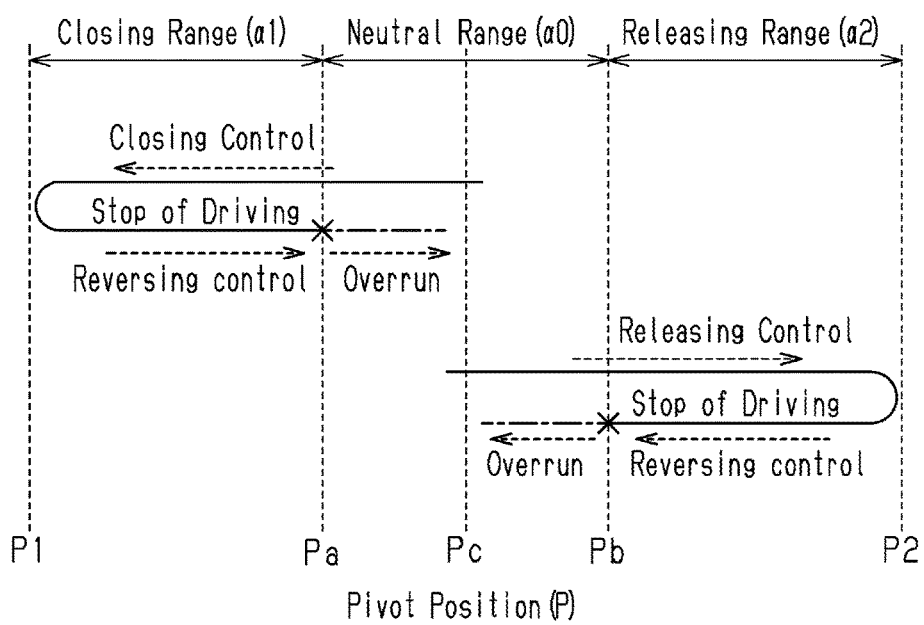
FIG. 21 is a diagram illustrating an overrun that occurs after reversing control ends.

As shown in FIG. 21, the door ECU 15 stops the supply of power to the motor 45 of the closer device 40 to end the reversing control and stop reverse pivoting of the active lever 50. During normal neutral return control that uses the first neutral switch 30d (refer to FIG. 13, step 304, same as releasing control), inertia produced after stopping driving of the motor 45 or the like results in the active lever 50 overrunning to near the middle of the neutral range α0, that is, to the vicinity of the third state change point Pc (shown by dashed lines in FIG. 21).

Figure 22:
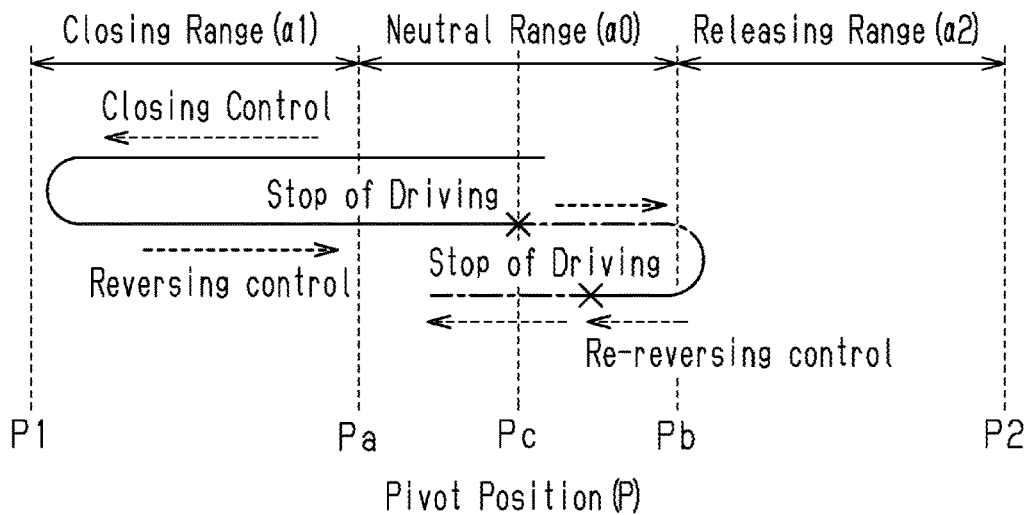
FIG. 22 is a diagram illustrating a case where the first neutral switch has an anomaly during reversing control after closing control.

As shown in FIG. 22, if the door ECU 15 stops reverse pivoting of the active lever 50 based on a change in the on/off state of the second neutral switch 30e (refer to FIG. 12, step 202: YES, and step 204), the door ECU 15 reverses the active lever 50 in the reverse direction (re-reversing control).

When the second neutral switch 30e stops reverse pivoting of the active lever 50 due to an anomaly in the first neutral switch 30d, the active lever 50 overruns over an excessive amount after driving stops. Accordingly, the door ECU 15 performs the re-reversing control. This allows the active lever 50 to be arranged at a more suitable standby position during backup control, which uses the second neutral switch 30e.

During the reversing control after the closing control, if the second neutral switch 30e stops reverse pivoting of the active lever 50, specifically, if the door ECU 15 stops the pivoting in the second direction from the closing range α1 toward the releasing range α2, the door ECU 15 subsequently reverses the active lever 50 to the first direction, which is opposite to the second direction. This arranges the active lever 50 at a more suitable position.

Figure 23:
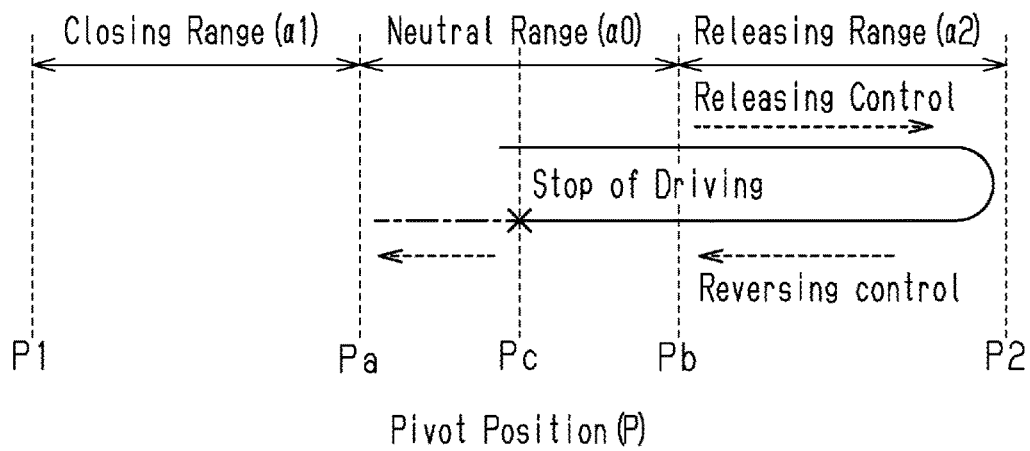
FIG. 23 is a diagram illustrating a case where the first neutral switch has an anomaly during reversing control after releasing control.

In contrast, as shown in FIG. 23, if the door ECU 15 stops reverse pivoting of the active lever 50 based on a change in the on/off state of the second neutral switch 30e during the reversing control after the releasing control, the door ECU 15 does not execute the re-reversing control.

The reversing control after the releasing control reverses pivoting of the active lever 50 to the first direction from the releasing range α2 toward the closing range α1. If the active lever 50 is further reversed in the opposite direction during the re-reversing control, the active lever 50 is moved from the closing range α1 toward the releasing range α2. Reverse pivoting of the active lever 50 toward the releasing range α2 is stopped at a position closer to the releasing range α2 than the boundary between the closing range α1 and the neutral range α0 where the reverse pivoting of the active lever 50 is stopped during the normal reversing control after the closing control (refer to FIG. 21).

Thus, if the re-reversing control is performed after the second neutral switch 30e stops reverse pivoting of the active lever 50 during the reversing control after the releasing control, the active lever 50 may overrun after the active lever 50 stops to a position where the latch mechanism 4 performs a releasing action.

Accordingly, the door ECU 15 executes the re-reversing control only if the reversing control is executed after the closing control when the second neutral switch 30e stops reverse pivoting of the active lever 50. Thus, the lock device 5 arranges the active lever 50 at a more suitable standby position while ensuring a high level of safety.

Figure 24:
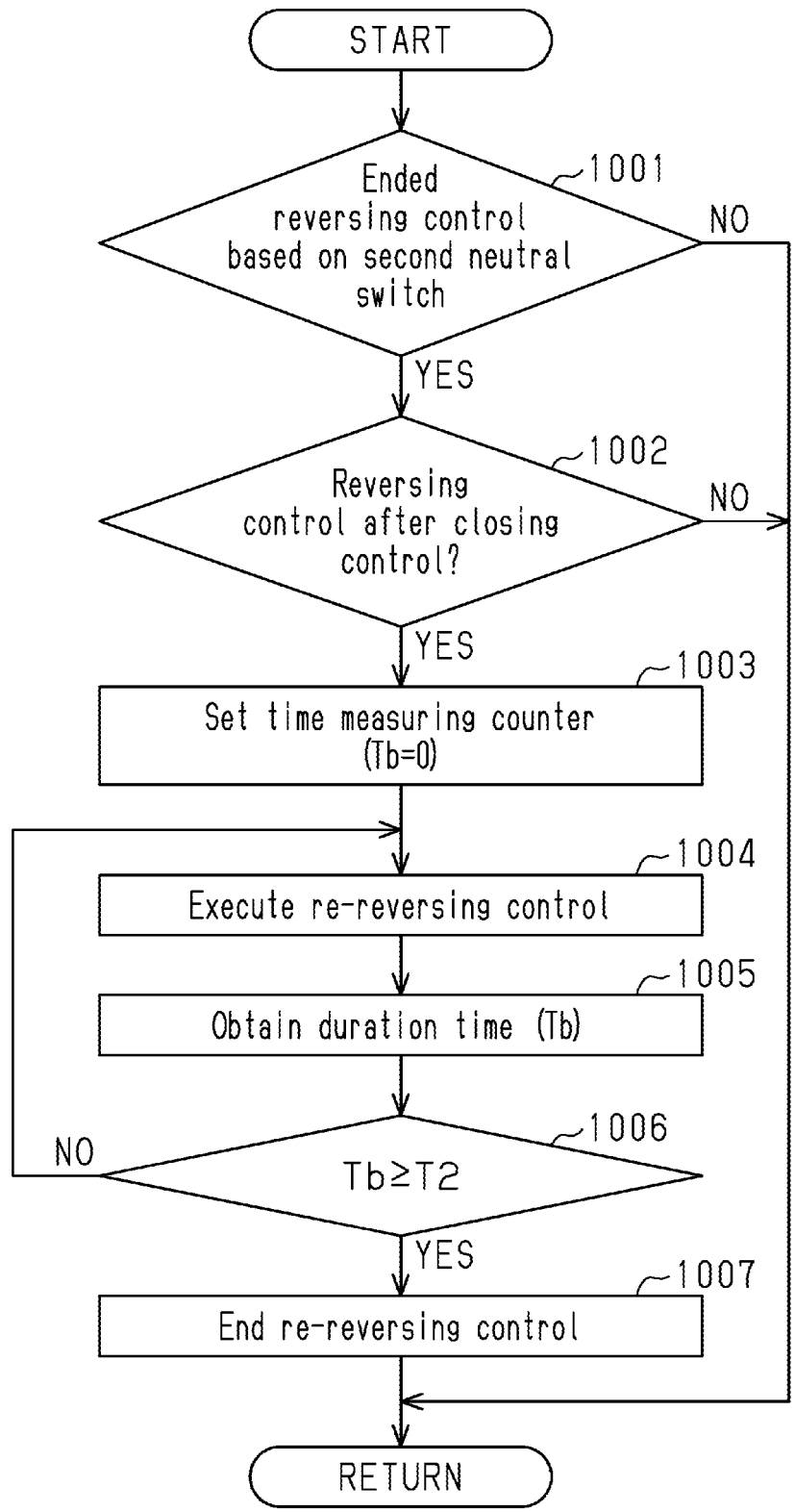
FIG. 24 is a flowchart showing the procedure for re-reversing control.

As shown in the flowchart of FIG. 24, if the door ECU 15 has ended the reversing control of the active lever 50 based on a change in the on/off state of the second neutral switch 30e (step 1001: YES), the door ECU 15 determines whether the reversing control was executed after the closing control (step 1002). If the reversing control was executed after the closing control (step 1002: YES), the door ECU 15 sets a time measuring counter 60b serving as a re-reversing counter (Tb=0, step 1003) and executes the re-reversing control (step 1004).

The door ECU 15 obtains a duration time Tb, which is a count value of the time measuring counter 60b, (step 1005) and determines whether the duration time Tb of the re-reversing control has reached a predetermined time T2 (step 1006). If the duration time Tb has reached the predetermined time T2 (Tb≥T2, step 1006: YES), the door ECU 15 ends the re-reversing control (step 1007).

The present embodiment has the following advantages.

(1) The lock device 5 includes the first neutral switch 30d that changes the on/off state at the first and second state change points Pa, Pb. The first and second state change points Pa, Pb are pivot positions P of the active lever 50 between the first pivot end P1 and the second pivot end P2. The lock device 5 also includes the second neutral switch 30e that changes the on/off state at a single state change point (third state change point Pc), which is a pivot position P of the active lever 50 between the first and second state change points Pa, Pb. The door ECU 15, which serves as a reversing controller 82a, reverses the active lever 50, which serves as a pivot member, after completing the closing control that pivots the active lever 50 in the first direction and the releasing control that pivots the active lever 50 in the second direction. The door ECU 15, which serves as a reversing stopper 82b, stops reverse pivoting of the active lever 50 based on a change in the on/off state of the first neutral switch 30d and a change in the on/off state of the second neutral switch 30e. If reverse pivoting of the active lever 50 is stopped based on a change in the on/off state of the second neutral switch 30e during the reversing control after the closing control (refer to FIG. 15, step 502: YES), the door ECU 15, which serves as a first anomaly detector 82c, detects the occurrence of a first state change anomaly in the first neutral switch 30d (step 503). If reverse pivoting of the active lever 50 is stopped based on a change in the on/off state of the second neutral switch 30e during the reversing control after the releasing control (step 502: NO), the door ECU 15, which serves as a second anomaly detector 82d, detects the occurrence of a second state change anomaly in the first neutral switch 30d (step 504).

Even if the first neutral switch 30d is a single physical component (rotary switch 57), a first state change anomaly and a second state change anomaly do not necessarily occur at the same time. However, the above structure allows a first state change anomaly and a second state change anomaly to be detected separately. This allows for anomalies in the first neutral switch 30d to be coped with in a more appropriate manner.

(2) The door ECU 15 includes the first counter 70a that counts the number Na of first state change anomalies and the second counter 70b that counts the number Nb of second state change anomalies. If reverse pivoting of the active lever 50 serving as the pivot member is stopped based on a change in the on/off state of the first neutral switch 30d during the reversing control after the closing control (refer to FIG. 17, step 702: YES), the door ECU 15, which serves as a first initializer 82e, initializes the number Na of first state change anomalies (Na=0, step 703). If reverse pivoting of the active lever 50 serving as the pivot member is stopped based on a change in the on/off state of the first neutral switch 30d during the reversing control after the releasing control (step 702: NO), the door ECU 15, which serves as a second initializer 82f, initializes the number Nb of second state change anomalies (Nb=0, step 704). If the number Na of first state change anomalies or the number Nb of second state change anomalies has exceeded the predetermined threshold N1 (refer to FIG. 16, Na≥N1, step 603: YES or Nb≥N1, step 607: YES), the door ECU 15, which serves as a first failure detector 82g, detects failure of the first neutral switch 30d (step 604).

With this structure, failure of the first neutral switch 30d is detected appropriately when an anomaly is detected a number of times even if detection results (anomalous/normal) change alternately depending on the direction of reverse pivoting of the active lever 50. This ensures a high level of reliability.

(3) The second neutral switch 30e is in an on state when the pivot position P of the active lever 50 is between the first pivot end P1 and the third state change point Pc. The second neutral switch 30e is in an off state when the pivot position P of the active lever 50 is between the third state change point Pc and the second pivot end P2 (refer to FIG. 10B). When the closing control has been completed (refer to FIG. 19, step 801: YES), if the second neutral switch 30e is in an off state (step 802: NO), the door ECU 15, which serves as a third anomaly detector 82h, detects a third state change anomaly in the second neutral switch 30e (step 804). When the releasing control has been completed (step 805: YES), if the second neutral switch 30e is in an on state (step 806: NO), the door ECU 15, which serves as a fourth anomaly detector 82i, detects a fourth state change anomaly in the second neutral switch 30e (step 807).

This structure separately detects a third state change anomaly and a fourth state change anomaly solely with the second neutral switch 30e. This ensures a high level of reliability.

(4) The door ECU 15 includes the third counter 70c that counts the number Nc of third state change anomalies and the fourth counter 70d that counts the number Nd of fourth state change anomalies. Further, when the closing control has been completed (refer to FIG. 19, step 801: YES), if the second neutral switch 30e is in an on state (step 802: YES), the door ECU 15, which serves as a third initializer 82j, initializes the number Nc of third state change anomalies (Nc=0, step 808). When the releasing control has been completed (step 805: YES), if the second neutral switch 30e is in an off state (step 806: YES), the door ECU 15, which serves as a fourth initializer 82k, initializes the number Nd of fourth state change anomalies (Nd=0, step 809). If the number Nc of third state change anomalies or the number Nd of fourth state change anomalies has exceeded the predetermined threshold N2 (refer to FIG. 20, Nc≥N2, step 903: YES or Nd≥N2, step 907: YES), the door ECU 15, which serves as a second failure detector 82l, detects failure of the second neutral switch (step 904).

With this structure, failure of the second neutral switch 30e is detected appropriately when an anomaly is detected a number of times even if detection results (anomalous/normal) change alternately depending on the direction of reverse pivoting of the active lever 50. This ensures a high level of reliability. In particular, the second neutral switch 30e may often include only a third state change anomaly or a fourth state change anomaly and be free from other state change anomalies (on state is fixed or off state is fixed). Accordingly, the above structure will obtain significant advantages.

(5) When the closing control has been completed, if the pivot position P of the active lever 50 is between the first and second state change points Pa, Pb, namely, in the neutral range α0 (step 803: YES), the door ECU 15, which serves as the third anomaly detector 82h, does not detect a third state change anomaly.

A closing action may be performed with the latch mechanism 4 when the user manually closes the sliding door 1. That is, the closing control may be completed while the pivot position P of the active lever 50 is in the neutral range α0. Accordingly, the above structure detects the third state change anomaly in a more accurate manner.

(6) If the door ECU 15, which serves as a re-reversing controller 83a, stops the reverse pivoting of the active lever 50 in accordance with the second neutral switch 30e during the reversing control after the closing control (refer to FIG. 24, step 1002: YES), the door ECU 15 executes the re-reversing control that reverses the active lever 50 in the reverse direction (steps 1003 to 1007). If the second neutral switch 30e stops reverse pivoting of the active lever 50 during the reversing control after the releasing control (step 1002: NO), the door ECU 15 does not execute the re-reversing control.

The active lever 50 usually continues to move for a while after stopping due to inertia of the motor 45 or the like. Thus, when the second neutral switch 30e stops reverse pivoting of the active lever 50 due to an anomaly in the first neutral switch 30d, the active lever 50 overruns over an excessive amount after driving stops. However, the above structure arranges the active lever 50 at a more suitable standby position by executing the re-reversing control. Further, such re-reversing control is not executed during the reversing control after the releasing control, which would further reverse the active lever 50 to the second direction toward the releasing range α2. Thus, an overrun after the re-reversing control will not move the active lever 50 to a position where the latch mechanism 4 performs a releasing action. This ensures a high level of reliability.

(7) The door ECU 15 includes the time measuring counter 60b, which serves as a re-reversing counter that increments its count as the re-reversing control continues. If the duration time Tb, which is measured by the time measuring counter 60b, reaches the predetermined time T2 (Tb≥T2, step 1006: YES), the door ECU 15, which serves as a re-reversing terminator 83b, ends the re-reversing control (step 1007). This allows the active lever 50 to be arranged at a more suitable standby position taking into consideration overrun after stopping without relying on the neutral switches 30d, 30e.

(8) The door ECU 15, which serves as a reversing controller 81a, completes the closing control that constrains the sliding door 1 with the latch mechanism 4 by pivoting the active lever 50 of the lock device 5 in the first direction and then reversing the active lever 50 in the second direction by executing the reversing control (refer to FIG. 11). The door ECU 15, which serves as a position detector 81b, detects the pivot position P of the active lever 50 based on the on/off states of the neutral switches 30d, 30e of the lock device 5. When the closing control has been completed, if the pivot position P of the active lever 50 is determined as being in the neutral range α0 between the closing range α1 and the releasing range α2 (refer to FIG. 13, step 306: YES), the door ECU 15, which serves as the reversing controller 81a, does not execute the reversing control (step 307).

A closing action may be performed with the latch mechanism 4 when the user manually closes the sliding door 1. Thus, even if the neutral switches 30d, 30e are normal and the pivot position P is detected without any error, the active lever 50 may be in the neutral range α0 when the closing control has been completed. In such a case, the reversing control may move the active lever 50 to the releasing range α2. However, the above structure reduces the possibility of the active lever 50 being moved toward the releasing range α2 so that the latch mechanism 4 will perform the releasing action after the closing control has been completed. This ensures a high level of safety.

(9) The door ECU 15 includes the time measuring counter 60a, which serves as a reversing counter that increments its count as reversing control continues. When the closing control has been completed, if the vehicle is stopped (refer to FIG. 13, step 303: YES), the door ECU 15, which serves as a reversing controller 81a, executes the first reversing control that stops reverse pivoting of the active lever 50 based on changes in the on/off states of the neutral switches 30d, 30e (step 304). When the closing control has been completed, if the vehicle is traveling (step 303: NO), the door ECU 15 executes the second reversing control that stops reverse pivoting of the active lever 50 when the duration time Ta of the closing control, which is measured by the time measuring counter 60a, reaches the predetermined time T1 (step 305, refer to FIG. 14). When the second reversing control is executed, if determined that the active lever 50 has moved from the closing range al to the neutral range α0 based on the on/off states of the neutral switches 30d, 30e (step 408: YES), the door ECU 15 stops reverse pivoting of the active lever 50 (step 406).

The neutral switches 30d, 30e are used as backups so that a predetermined value corresponding to the amount of reverse pivoting of the active lever 50 measured by the time measuring counter 60a, that is, the predetermined time T1 that is a threshold value for the duration time Ta of the second reversing control can be set to a greater value. This allows the latch mechanism 4 to readily perform a releasing action in the next releasing control. As a result, a loud releasing noise that would be produced when the latch mechanism 4 performs a releasing action before the sliding door 1 opens is not produced.

(10) When the closing control has been completed, if the pivot position P of the active lever 50 is determined as being in the releasing range α2 (step 306: NO), the door ECU 15, which serves as an anomaly determiner 81c, determines that the neutral switches 30d, 30e are anomalous (step 308).

Usually, during the reversing control after the releasing control, an end of the reversing control is determined based on changes in the on/off states of the neutral switches 30d, 30e. When the closing control is executed, the active lever 50 is located in the neutral range α0 from when the closing control is started. Accordingly, the above structure accurately determines anomalies in the neutral switches 30d, 30e.

The above-described embodiment may be modified as follows.

The above embodiment is applied to the power sliding door device 20, which opens and closes the sliding door 1 on the side surface of the vehicle, and the lock device 5. Instead, the above embodiment may be applied to other power door devices such as a swing door. The above embodiment may also be applied to a back door or a trunk door provided at the rear of a vehicle. The above embodiment may also be applied to a vehicle opening/closing body controller intended for an opening/closing body other than a door.

The number and the arrangement of the lock devices 5 located in the sliding door 1 may be changed in any manner.

In the above embodiment, the lock device 5 includes the active lever 50, which is motor-driven and pivoted in the first direction and the second direction. The latch mechanism 4 performs a closing action and a releasing action in accordance with the pivoting direction of the active lever 50. Instead, the structure of the pivot member pivoted in the first direction and the second direction to perform a closing action and a releasing action with the latch mechanism 4 may be changed in any manner.

In the embodiment, the first neutral switch 30d is in an off state when the pivot position P of the active lever 50 is between the first pivot end P1 and the first state change point Pa and between the second state change point Pb and the second pivot end P2. The first neutral switch 30d is in an on state when the pivot position P of the active lever 50 is between the first state change point Pa and the second state change point Pb. The second neutral switch 30e is in an on state when the pivot position P of the active lever 50 is between the first pivot end P1 and the third state change point Pc. The second neutral switch 30e is in an off state when the pivot position P of the active lever 50 is between the third state change point Pc and the second pivot end P2. Instead, the on/off states (first and second output states) of the neutral switches 30d, 30e may be reversed.

More specifically, the first neutral switch 30d may be in an on state when the pivot position P of the active lever 50 is between the first pivot end P1 and the first state change point Pa. The first neutral switch 30d may be in an on state when the pivot position P of the active lever 50 is between the second state change point Pb and the second pivot end P2. The first neutral switch 30d may be in an off state when the pivot position P of the active lever 50 is between the first and second state change points Pa, Pb. The second neutral switch 30e may be in an off state when the pivot position P of the active lever 50 is between the first pivot end P1 and the third state change point Pc. The second neutral switch 30e may be in an on state when the pivot position P of the active lever 50 is between the third state change point Pc and the second pivot end P2.

Figure 25:
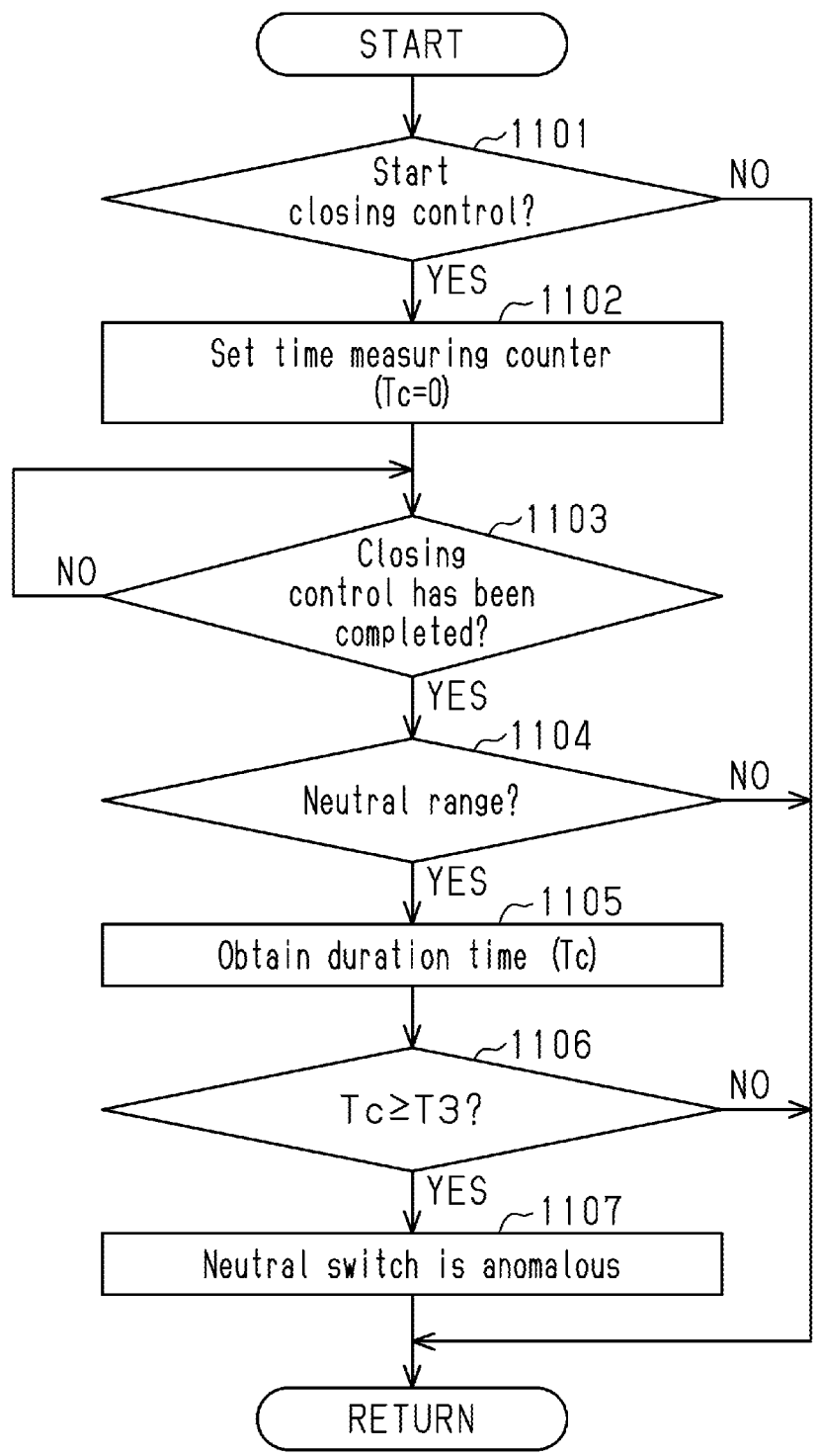
FIG. 25 is a flowchart showing the procedure for determining an anomaly in the neutral switch.

Further, as shown in the flowchart of FIG. 25, when the door ECU 15 starts the closing control (step 1101: YES), the door ECU 15 sets a time measuring counter 60c, which serves as a closing counter (Tc=0, step 1102, refer to FIG. 1). When the closing control has been completed (step 1103: YES), the door ECU 15 determines whether the pivot position P of the active lever 50 is in the neutral range $\alpha 0$ (step 1104). If the pivot position P of the active lever 50 is in the neutral range $\alpha 0$ (step 1104: YES), the door ECU 15 obtains a duration time Tc of the closing control, which is a count value of the time measuring counter 60b (step 1105). The door ECU 15 determines whether the duration time Tc of the closing control is greater than or equal to a predetermined time T3 that is set to a value allowing for assumption that the closing control has moved the active lever 50 from the neutral range $\alpha 0$ to the closing range $\alpha 1$ (step 1106). If the duration time Tc of the closing control is greater than or equal to the predetermined time T3 (Tc≥T3, step 1106: YES), the door ECU 15, which serves as the anomaly determiner 81c, may determine that the neutral switches 30d, 30e are anomalous (step 1107). Accordingly, anomaly in the neutral switches 30d, 30e will be determined with a simple structure.

Further, the configuration such as that shown in FIG. 13 that does not execute the reversing control if the pivot position P of the active lever 50 is determined as being in the neutral range $\alpha 0$ between the closing range $\alpha 1$ and the releasing range $\alpha 2$ when the closing control is completed may be applied to a structure that includes a neutral sensor differing from the above embodiment. In this case, the neutral sensor only needs to be able to determine if the pivot position P of the active lever 50, which serves as a pivot member, is in the closing range $\alpha 1$, the releasing range $\alpha 2$, or the neutral range $\alpha 0$. The anomaly determination of the neutral sensor in this case (step 308) and anomaly determination of the neutral sensor in the above example (refer to FIG. 25) may also be applied to a structure that includes a neutral sensor differing from the above embodiment.

In the above embodiment, the end of the re-reversing control is determined using the time measuring counter 60c, which serves as a re-reversing counter. Instead, a neutral switch may be used.

The time measuring counters 60a to 60c, which respectively serve as the reversing counter, the re-reversing counter, and the closing counter, may be a counter incremented in each operation cycle or be a free-run counter.

The reversing counter, the re-reversing counter, and the closing counter formed by the counters 60 do not need to be time measuring counters 60a to 60c as long as they increment while the reversing control, the re-reversing control, and the closing control continue. The counter may increment in synchronism with rotation of the motor 45 that serves as a drive source of the active lever 50. That is, the count value suggests an amount of movement of the active lever 50.

Technical concepts that can be recognized from the above embodiments will now be described together with their advantages.

(A) A vehicle opening/closing body controller, wherein the controller includes a re-reversing controller configured to pivot the pivot member in a direction opposite to a pivot direction of the reverse pivoting when the reverse pivoting of the pivot member is stopped based on a change in the on/off state of the second neutral switch, the re-reversing controller executes re-reversing control for pivoting the pivot member in the first direction when the reverse pivoting of the pivot member is stopped based on a change in the on/off state of the second neutral switch during the reversing control after the closing control, and the re-reversing controller does not pivot the pivot member in the second direction when the reverse pivoting of the pivot member is stopped based on a change in the on/off state of the second neutral switch during the reversing control after the releasing control.

The pivot member usually continues to move for a while after stopping due to inertia of the motor or the like, which serves as a drive source. Thus, when the second neutral switch stops reverse pivoting of the pivot member due to an anomaly in the first neutral switch, the pivot member overruns over an excessive amount after driving stops. However, the above structure arranges the pivot member at a more suitable standby position by executing the re-reversing control. Further, such re-reversing control is not executed during the reversing control after the releasing control, which would further reverse the pivot member to the second direction toward the releasing range. Thus, an overrun after the re-reversing control will not move the pivot member to a position where the latch mechanism performs a releasing action. This ensures a high level of reliability.

(B) The vehicle opening/closing body controller, wherein the controller includes a re-reversing counter configured to increment its count during the re-reversing control, and a re-reversing terminator configured to end the re-reversing control when a count value of the re-reversing counter reaches a predetermined value.

The above structure allows the pivot member to be arranged at a more suitable standby position taking into consideration overrun after stopping without relying on the neutral switches.

(C) The vehicle opening/closing body controller, wherein the controller is configured to execute the closing control that constrains the vehicle opening/closing body with the latch mechanism by pivoting the pivot member in the first direction and performing the closing action with the latch mechanism, the range of movement of the pivot member includes a closing range where the closing action is performed with the latch mechanism, a releasing range where the releasing action is performed with the latch mechanism to release the constraint on the opening/closing body, and a neutral range between the closing range and the releasing range, the controller includes a reversing controller configured to execute reversing control that reverses the pivot member after the closing control has been completed and a position detector configured to detect the pivot position of the pivot member based on the on/off state of the neutral switch, the position detector is configured to determine if the pivot position of the pivot member is in the closing range, the releasing range, or the neutral range, and the reversing controller is configured not to execute the reversing control if the pivot position of the pivot member is determined as being in the neutral range when the closing control has been completed.

A closing action may be performed with the latch mechanism when the user manually closes the opening/closing body. Thus, even if the neutral switch is normal and the pivot position is detected without any error, the pivot member may be in the neutral range when the closing control has been completed. In such a case, the reversing control may move the pivot member to the releasing range. However, the above structure reduces the possibility that the pivot member will move toward the releasing range and the releasing action will be performed with the latch mechanism after the closing control has been completed. This ensures a high level of safety.

(D) The vehicle opening/closing body controller, wherein the controller includes a closing counter configured to increment its count during the closing control and an anomaly determiner configured to determine an anomaly in the neutral switch, and the anomaly determiner is configured to determine that the neutral switch is anomalous when the pivot position of the pivot member is determined as being in the neutral range based on the on/off state of the neutral switch when the closing control has been completed and when the pivot member is determined as having moved from the neutral range to the closing range based on the count value of the closing counter.

The above structure determines an anomaly in the neutral switch with a simple structure.

(E) The vehicle opening/closing body controller, wherein the controller includes a reversing counter configured to increment its count during the reversing control, the reversing controller is configured to execute first reversing control if the vehicle is stopped when the closing control has been completed and execute second reversing control if the vehicle is traveling when the closing control has been completed, the first reversing control stops the reverse pivoting of the pivot member when the pivot member is determined as having moved from the closing range to the neutral range based on the on/off state of the neutral switch, and the second reversing control stops the reverse pivoting of the pivot member when a count value of the reversing counter reaches a predetermined value or when the pivot member is determined as having moved from the closing range to the neutral range based on the on/off state of the neutral switch.

With the above structure, the neutral switch is used as a backup for end determination to set a greater value for a predetermined value that corresponds to the amount of reverse pivoting of the pivot member, which is measured by the counter. This will quickly perform the releasing action with the latch mechanism in the next releasing control. This allows the latch mechanism to readily perform a releasing action in the next releasing control. As a result, a loud releasing noise that would be produced when the latch mechanism performs a releasing action before the opening/closing body opens is not produced.

(F) The vehicle opening/closing body controller, wherein the anomaly determiner is configured to determine that the neutral switch is anomalous if the pivot position of the pivot member is determined as being in the releasing range when the closing control is completed.

Usually, during the reversing control after the releasing control, the end of the reversing control is determined based on a change in the on/off state of the neutral switch. When the closing control is performed, the pivot member is positioned in the neutral range from a starting point. Accordingly, the above structure determines an anomaly in the neutral switch in an accurate manner.

The invention claimed is:

1. A vehicle opening/closing body controller comprising:
a lock device including a latch mechanism; and
a controller that is configured to control actuation of the lock device, wherein
the lock device is configured to perform a closing action and a releasing action with the latch mechanism in accordance with a pivot direction of a pivot member pivoted in a first direction and a second direction, which is opposite to the first direction, between a first pivot end and a second pivot end,
the lock device includes
a first neutral switch configured to change an on/off state at first and second state change points that are pivot positions of the pivot member between the first pivot end and the second pivot end, and
a second neutral switch configured to change an on/off state at a third state change point that is a pivot position of the pivot member between the first and second state change points,
the controller is configured to execute closing control that constrains a vehicle opening/closing body with the latch mechanism by pivoting the pivot member in the first direction and performing the closing action with the latch mechanism and execute releasing control that releases the constraint on the opening/closing body with the latch mechanism by pivoting the pivot member in the second direction and performing the releasing action with the latch mechanism,
the controller includes,
a reversing controller configured to execute reversing control for reversely pivoting the pivot member after the closing control is completed and after the releasing control is completed,
a reversing stopper configured to stop the reverse pivoting of the pivot member based on a change in the on/off state of the first neutral switch or a change in the on/off state of the second neutral switch, a first anomaly detector configured to detect a first state change anomaly that occurs in the first neutral switch when the reverse pivoting of the pivot member is stopped based on a change in the on/off state of the second neutral switch during the reversing control after the closing control, and a second anomaly detector configured to detect a second state change anomaly that occurs in the first neutral switch when the reverse pivoting of the pivot member is stopped based on a change in the on/off state of the second neutral switch during the reversing control after the releasing control.

2. The vehicle opening/closing body controller according to claim 1, wherein the controller includes a first counter configured to count a detection number of first state change anomalies, a second counter configured to count a detection number of second state change anomalies, a first initializer configured to initialize the detection number of the first state change anomalies when reverse pivoting of the pivot member is stopped based on a change in an on/off state of the first neutral switch during the reversing control after the closing control, a second initializer configured to initialize the detection number of the second state change anomalies when reverse pivoting of the pivot member is stopped based on a change in an on/off state of the first neutral switch during the reversing control after the releasing control, and a first failure detector configured to detect failure of the first neutral switch when the detection number of first state change anomalies or the detection number of second state change anomalies exceeds a predetermined threshold value.

3. The vehicle opening/closing body controller according to claim 1, wherein the second neutral switch is in a first output state when the pivot position of the pivot member is between the first pivot end and the third state change point and in a second output state when the pivot position of the pivot member is between the third state change point and the second pivot end, the controller includes a third anomaly detector configured to detect a third state change anomaly that occurs in the second neutral switch when the second neutral switch is in the second output state when the closing control is completed, and a fourth anomaly detector configured to detect a fourth state change anomaly that occurs in the second neutral switch when the second neutral switch is in the first output state when releasing control is completed.

4. The vehicle opening/closing body controller according to claim 3, wherein the controller includes a third counter configured to count a detection number of third state change anomalies, a fourth counter configured to count a detection number of fourth state change anomalies, a third initializer configured to initialize the detection number of the third state change anomalies when the second neutral switch is in the first output state when the closing control is completed, a fourth initializer configured to initialize the detection number of the fourth state change anomalies when the second neutral switch is in the second output state when the releasing control is completed, and a second failure detector configured to detect failure of the second neutral switch when the detection number of the third state change anomalies or the detection number of the fourth state change anomalies exceeds a predetermined threshold value.

5. The vehicle opening/closing body controller according to claim 3, wherein the third anomaly detector is configured not to detect the third state change anomaly when the pivot position of the pivot member is between the first and second state change points when the closing control is completed.

* * * * *